(12) United States Patent
Zhang et al.

(10) Patent No.: US 9,337,994 B2
(45) Date of Patent: May 10, 2016

(54) METHOD, RECEIVER AND SYSTEM FOR SIGNAL SYNCHRONIZATION

(71) Applicants: Beijing Lenovo Software Ltd., Beijing (CN); Lenovo (Beijing) Limited, Beijing (CN)

(72) Inventors: Li Zhang, Beijing (CN); Jie Wang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 168 days.

(21) Appl. No.: 14/220,242

(22) Filed: Mar. 20, 2014

(65) Prior Publication Data

US 2014/0321450 A1  Oct. 30, 2014

(30) Foreign Application Priority Data

Mar. 21, 2013  (CN) .......................... 2013 1 0091440

(51) Int. Cl.
*H04L 7/00*     (2006.01)
*H04L 27/26*    (2006.01)
*H04W 56/00*    (2009.01)
*H04J 11/00*    (2006.01)

(52) U.S. Cl.
CPC ........... *H04L 7/0016* (2013.01); *H04J 11/0073* (2013.01); *H04J 11/0076* (2013.01); *H04L 27/26* (2013.01); *H04W 56/0035* (2013.01); *H04W 56/0085* (2013.01)

(58) Field of Classification Search
None
See application file for complete search history.

(56) References Cited

U.S. PATENT DOCUMENTS

| 2010/0040043 | A1* | 2/2010 | Li  | H04L 27/2656 370/350 |
| 2010/0118990 | A1* | 5/2010 | Lee | H04L 27/2656 375/260 |
| 2013/0176991 | A1* | 7/2013 | Yi  | H04J 11/0076 370/336 |

* cited by examiner

*Primary Examiner* — Michael Thier
*Assistant Examiner* — Yaotang Wang
(74) *Attorney, Agent, or Firm* — Westman, Champlin & Koehler, P.A.

(57) ABSTRACT

In a method for time domain joint synchronization in downlink, a sequence to be analyzed is obtained from a received time domain signal; the sequence to be analyzed is downsampled by a factor of $\alpha$ to obtain a down-sampled sequence; an initial timing estimation is performed based on the down-sampled sequence; a frequency offset compensation is applied to the sequence to be analyzed based on an Integral Frequency Offset (IFO) estimation value $\hat{\epsilon}$ obtained by the initial timing estimation; a Fractional Frequency Offset (FFO) estimation value $\hat{\epsilon}_f$ is obtained; a frequency offset compensation is applied to the sequence to be analyzed based on the IFO estimation value $\hat{\epsilon}$ and the FFO estimation value $\hat{\epsilon}_f$; and a further timing estimation is performed based on a position interval estimated using an initial timing position and a Primary Synchronization Sequence (PSS) to obtain a fine timing position.

20 Claims, 11 Drawing Sheets

METHOD, RECEIVER AND SYSTEM FOR SIGNAL SYNCHRONIZATION

CROSS-REFERENCE TO RELATED APPLICATION

This Application claims priority to Chinese Application No. 201310091440.8, filed on Mar. 21, 2013, in Chinese. The content of which is hereby incorporated by reference in its entirety.

TECHNICAL FIELD

The present invention relates to communication technology, and more particularly, to a method, receiver and system for time domain joint synchronization in downlink.

BACKGROUND

A Long Term Evolution (LTE) system is a communication system which adopts an Orthogonal Frequency Division Multiplexing (OFDM) multi-carrier modulation technique in the physical layer. The fundamental principle of the OFDM technique is to convert a high-speed series data stream into N low-speed data streams for parallel transmission. These data streams are carried by orthogonally separable sub-carriers and can effectively combat frequency-selective fading and improve system throughput significantly. However, for the OFDM technique, a timing deviation or a frequency deviation may extremely degrade the system performance. Thus, timing synchronization and frequency synchronization are theoretical and practical problems that have to be solved in the LTE system.

The timing synchronization can be categorized into wireless data frame timing synchronization, OFDM symbol block synchronization and sampling clock synchronization. The wireless data frame timing synchronization and the OFDM symbol block synchronization are mainly discussed herein. An OFDM symbol block consists of a Cyclic Prefix (CP) and a payload. The OFDM symbol block synchronization is to determine the start time of the payload in an OFDM symbol. Here, a timing offset will result in a phase rotation of a sub-carrier. This can be interpreted using the property of Fourier transformation that an offset in time domain corresponds to a phase rotation in frequency domain. If an addition of a timing offset and a length of maximum delay spread of channel is smaller than the length of the CP, orthogonality among the sub-carriers may be maintained and there is no Inter-Symbol Interference (ISI) and Inter-Carrier Interference (ICI). However, if the timing offset and the length of maximum delay spread of channel is larger than the length of the CP, the orthogonality among the sub-carriers will be damaged, resulting in ISI and ICI that significantly degrades the system performance.

On the other hand, a carrier frequency offset, or frequency offset for short, is mainly caused by a difference in local carrier frequencies between a transmitter and a receiver, a Doppler shift and the like. An integral carrier frequency offset will not cause any ICI, but will result in a 50% of error probability for information symbols demodulated at the receiver. A fractional carrier frequency offset will damage the orthogonality among the sub-carriers and thus cause ICI. In order to achieve a carrier frequency synchronization between the transmitter and the receiver, it is necessary to estimate and then compensate for the frequency offset.

During the implementation of the present invention, the inventors have found at least the following problem. The LTE-related protocols only define various specifications for the uplink transmitter, but do not define any specific implementation for the downlink receiver. Hence, with the development of the synchronization techniques, a number of different schemes for timing synchronization and frequency offset estimation have been proposed. Most of the existing schemes for timing synchronization and frequency offset estimation, despite their high synchronization accuracy, are time-consuming due to a very high computation load associated with these schemes for timing synchronization and frequency offset estimation.

SUMMARY

It is an object of the present invention to provide a method, receiver and system for signal synchronization, capable of solving the problem that the existing schemes for timing synchronization and frequency offset estimation, despite their high synchronization accuracy, are time-consuming due to a very high computation load. The solutions according to the present invention are as follows.

According to a first aspect of the present invention, a method for signal synchronization is provided. The method is applied in a receiver and comprises: obtaining a sequence to be analyzed y from a received time domain signal; down-sampling the sequence to be analyzed y by a factor of α to obtain a down-sampled sequence and performing an initial timing estimation based on the down-sampled sequence and n different predetermined Integral Frequency Offset (IFO) candidate values to determine an initial timing position $T_{coarse}$, an IFO estimation value $\hat{\epsilon}$ and a Primary Synchronization Sequence (PSS) corresponding to the sequence to be analyzed y; applying a frequency offset compensation to the sequence to be analyzed y based on the IFO estimation value $\hat{\epsilon}$ and performing an initial frequency offset estimation based on the initial timing position $T_{coarse}$ and the determined PSS to obtain a Fractional Frequency Offset (FFO) estimation value $\hat{\epsilon}_f$; and applying an initial frequency offset compensation to the sequence to be analyzed y based on the IFO estimation value $\hat{\epsilon}$ and the FFO estimation value $\hat{\epsilon}_f$ and performing a further timing estimation based on the initial timing position $T_{coarse}$ and the determined PSS to obtain a fine timing position $T_{fine}$, wherein n is a positive integer equal to or larger than 1.

Further, the method further comprises, after the fine timing position $T_{fine}$ is obtained: extracting a secondary sequence segment to be analyzed from the sequence to be analyzed y based on the fine timing position $T_{fine}$; and applying a frequency offset compensation to the secondary sequence segment to be analyzed based on the IFO estimation value $\hat{\epsilon}$ and the FFO estimation value $\hat{\epsilon}_f$ and determining a Secondary Synchronization Sequence (SSS) corresponding to the secondary sequence segment to be analyzed and a timing position of a wireless data frame using a cross-correlation calculation, wherein m is a positive integer equal to or larger than 1.

Further, the method further comprises, after applying a frequency offset compensation to the secondary sequence segment to be analyzed based on the IFO estimation value $\hat{\epsilon}$ and the FFO estimation value $\hat{\epsilon}_f$ and determining a Secondary Synchronization Sequence (SSS) corresponding to the secondary sequence segment to be analyzed and a timing position of a wireless data frame using a cross-correlation calculation: performing a further frequency offset estimation based on the secondary sequence segment to be analyzed and the SSS corresponding to the secondary sequence segment to be analyzed to regenerate a FFO estimation value $\hat{\epsilon}_f$ and using the IFO estimation value $\hat{\epsilon}$ and the regenerated FFO estimation value $\hat{\epsilon}_f$ as final frequency offset estimation values.

Further said obtaining a sequence to be analyzed y from a received time domain signal comprises: extracting from the received time domain signal a sequence having a sampling rate equal to a maximum bandwidth sampling rate and a length of $N_{buffer}$ using a sliding window; and applying a narrow-band filtering to the sequence having the length of $N_{buffer}$ to obtain the sequence to be analyzed y that is located at a center position of a transmission bandwidth and has a bandwidth of a predetermined value, wherein $N_{buffer}$ belongs to (half of wireless frame length, half of wireless frame length+ one symbol length) and the predetermined value belongs to [1.08 MHz, 1.25 MHz].

Further, said down-sampling the sequence to be analyzed y by a factor of α to obtain a down-sampled sequence and performing an initial timing estimation based on the down-sampled sequence and n different predetermined Integral Frequency Offset (IFO) candidate values to determine an initial timing position $T_{coarse}$, an IFO estimation value $\hat{\epsilon}$ and a Primary Synchronization Sequence (PSS) corresponding to the sequence to be analyzed y comprises: down-sampling the sequence to be analyzed y by the factor of α to obtain the down-sampled sequence, where α is $2^n$; applying a frequency offset compensation to the down-sampled sequence based on the n different predetermined IFO candidate values to obtain n IFO compensated down-sampled sequences; performing a cross-correlation calculation based on the n IFO compensated down-sampled sequences and k time domain PSSs generated at the receiver to obtain k*n cross-correlation result sequences; determining a maximum element $max_i$ in each of the cross-correlation result sequences and a position $d_i$ corresponding to the maximum element $max_i$; selecting one of the k*n maximum elements $max_i$ that has a largest value, denoted as a largest element max; detecting whether the largest element max is larger than a predetermined threshold $P_{th}$; and determining, when it is detected that the largest element max is larger than the predetermined $P_{th}$, the position $d_i$ corresponding to the largest element max as the initial timing position $T_{coarse}$, the predetermined IFO candidate value corresponding to the cross-correlation result sequence to which the largest element max belongs as the IFO estimation value $\hat{\epsilon}$, and the PSS corresponding to the cross-correlation result sequence to which the largest element max belongs as the PSS corresponding to the sequence to be analyzed y, wherein k is a positive integer equal to or larger than 1.

Further, said performing a cross-correlation calculation based on the n IFO compensated down-sampled sequences and k time domain PSSs generated at the receiver to obtain k*n cross-correlation result sequences comprises: assuming the IFO compensated down-sampled sequence as $y_{compensate}$ and the time domain PSS as pss_time_downsampling, and performing the cross-correlation calculation in accordance with the following block-wise cross-correlation equation:

$$P(d) = \sum_{m=1}^{M} \left| \sum_{n=(m-1)L}^{mL-1} (y_{compensate}(n+d) \text{pss\_time\_downsampling}(n)) \right|^2,$$

$(N = ML)$ where M is a number of blocks, L is a length of a block, N is a length of the PSS, m is a block sequence number of a block and n is a sequence number within a block.

Further, said applying a frequency offset compensation to the sequence to be analyzed y based on the IFO estimation value $\hat{\epsilon}$ and performing an initial frequency offset estimation based on the initial timing position $T_{coarse}$ and the determined PSS to obtain a Fractional Frequency Offset (FFO) estimation value $\hat{\epsilon}_f$ comprises: applying a frequency offset compensation to the sequence to be analyzed y based on the IFO estimation value $\hat{\epsilon}$ to obtain a frequency offset compensated sequence to be analyzed y; extracting from the frequency offset compensated sequence to be analyzed y a primary sequence segment to be analyzed Rx_rss based on the initial timing position $T_{coarse}$; performing an initial frequency offset estimation based on the primary sequence segment to be analyzed Rx_rss and the determined PSS LocalPss to obtain the FFO estimation value $\hat{\epsilon}_f$ in accordance with:

$$\varepsilon_f = \frac{M}{2\pi}\arg\left\{\sum_{m=1}^{M-1}\left[\sum_{n=N(m-1)/M}^{Nm/M-1}(Rx\_Pss(n)LocalPss^*(n))\right]^*\right.$$
$$\left.\left[\sum_{n=Nm/M}^{N(m+1)/M-1}(Rx\_Pss(n)LocalPss^*(n))\right]\right\}$$

where M is a number of blocks, L is a length of a block, N is a length of the PSS, m is a block sequence number of a block and n is a sequence number within a block.

Further, said applying a frequency offset compensation to the sequence to be analyzed y based on the IFO estimation value $\hat{\epsilon}$ and the FFO estimation value $\hat{\epsilon}_f$ and performing a further timing estimation based on the initial timing position $T_{coarse}$ and the determined PSS to obtain a fine timing position $T_{fine}$ comprises: applying a frequency offset compensation to the sequence to be analyzed y based on the IFO estimation value $\hat{\epsilon}$ and the FFO estimation value $\hat{\epsilon}_f$ to obtain a frequency offset compensated sequence to be analyzed y; determining a position interval $[T_{coarse}-R, T_{coarse}+R]$ from the frequency offset compensated sequence to be analyzed y based on the initial timing position $T_{coarse}$; dividing the frequency offset compensated sequence to be analyzed y into 2R+1 data sequences Rx_Search based on the position interval; performing a cross-correlation calculation based on the 2R+1 data sequences Rx_Search and the determined PSS LocalPss to obtain 2R+1 cross-correlation result sequences; determining a maximum element $pmax_i$ in each of the cross-correlation result sequences and a position $pd_i$ corresponding to the maximum element $pmax_i$; selecting one of the 2R+1 maximum elements $pmax_i$ that has a largest value, denoted as a largest element pmax; and determining the position $pd_i$ corresponding to the maximum element pmax as the fine timing position $T_{fine}$, wherein R is a positive integer equal to or larger than 1.

Further, said extracting a secondary sequence segment to be analyzed from the sequence to be analyzed y based on the fine timing position $T_{fine}$ comprises: calculating a start position $T_{SSS}$ of the secondary sequence segment to be analyzed based on a timing relationship between the PSS and the SSS and the fine timing position $T_{fine}$ in accordance with:

$T_{SSS}=T_{fine}-L_{symbol}-L_{CP}$;

determining whether the start position $T_{SSS}$ is located within the sequence to be analyzed y; extracting the secondary sequence segment to be analyzed based on the start position $T_{SSS}$ when it is determined that the start position $T_{SSS}$ is located within the sequence to be analyzed y; recalculating, when it is determined that the start position $T_{SSS}$ is located outside the sequence to be analyzed y, the start position $T_{SSS}$ in accordance with:

$$T_{SSS}=T_{fine}-L_{symbol}-L_{CP}-L_{half\_of\_wireless\_frame};$$

extracting the secondary sequence segment to be analyzed based on the recalculated start position $T_{SSS}$, where $T_{fine}$ is a sequence number of the start position of the PSS corresponding to the sequence to be analyzed y, $L_{symbol}$ is a length of a symbol, $L_{CP}$ is a length of a Cyclic Prefix (CP), and $L_{half\_of\_wireless\_frame}$ is a length of half of a wireless data frame.

Further, said applying a frequency offset compensation to the secondary sequence segment to be analyzed based on the IFO estimation value and the FFO estimation value $\hat{\epsilon}_f$ and determining a Secondary Synchronization Sequence (SSS) corresponding to the secondary sequence segment to be analyzed and a timing position of a wireless data frame using a cross-correlation calculation comprises: applying a frequency offset compensation to the secondary sequence segment to be analyzed based on the IFO estimation value $\hat{\epsilon}$ and the FFO estimation value $\hat{\epsilon}_f$ to obtain a frequency offset compensated secondary sequence segment to be analyzed Rx_Sss; performing a cross-correlation calculation based on the frequency offset compensated secondary sequence segment to be analyzed Rx_Sss and m time domain SSSs generated at the receiver to obtain m cross-correlation result sequences; determining a maximum element $smax_i$ in each of the cross-correlation result sequences and a position $sd_i$ corresponding to the maximum element $smax_i$; selecting one of the m maximum elements $smax_i$ that has a largest value, denoted as a largest element smax; determining the SSS corresponding to the largest element smax as the SSS corresponding to the secondary sequence segment to be analyzed; and determining the timing position of the wireless data frame based on a type of the SSS corresponding to the secondary sequence segment to be analyzed and the position $sd_i$ corresponding to the largest element smax, wherein m is a positive integer equal to or larger than 1.

Further, said performing a further frequency offset estimation based on the secondary sequence segment to be analyzed and the SSS corresponding to the secondary sequence segment to be analyzed to regenerate a FFO estimation value $\hat{\epsilon}_f$ and using the IFO estimation value $\hat{\epsilon}$ and the regenerated FFO estimation value $\hat{\epsilon}_f$ as final frequency offset estimation values comprises: assuming the secondary sequence segment to be analyzed as Rx_Sss and the SSS corresponding to the secondary sequence segment to be analyzed as LocalSss and recalculating the FFO estimation value $\hat{\epsilon}_f$ in accordance with:

$$\varepsilon_f = \frac{M}{2\pi}\arg\left\{\sum_{m=1}^{M-1}\left[\sum_{n=N(m-1)/M}^{Nm/M-1}(Rx\_Sss(n)LocalSss^*(n))\right]^*\left[\sum_{n=Nm/M}^{N(m+1)/M-1}(Rx\_Sss(n)LocalSss^*(n))\right]\right\}$$

where M is a number of blocks, L is a length of a block, N is a length of the PSS, m is a block sequence number of a block and n is a sequence number within a block; and using the IFO estimation value $\hat{\epsilon}$ and the regenerated FFO estimation value $\hat{\epsilon}_f$ as the final frequency offset estimation values.

According to a second aspect of the present invention, a receiver is provided. The receiver comprises: a sequence obtaining module configured to obtain a sequence to be analyzed y from a received time domain signal; an initial timing estimation module configured to down-sample the sequence to be analyzed y obtained by the sequence obtaining module by a factor of α to obtain a down-sampled sequence and perform an initial timing estimation based on the down-sampled sequence and n different predetermined Integral Frequency Offset (IFO) candidate values to determine an initial timing position $T_{coarse}$, an IFO estimation value $\hat{\epsilon}$ and a Primary Synchronization Sequence (PSS) corresponding to the sequence to be analyzed y; an initial frequency offset estimation module configured to apply an initial frequency offset compensation to the sequence to be analyzed y obtained by the sequence obtaining module based on the IFO estimation value $\hat{\epsilon}$ determined by the initial timing estimation module and perform an initial frequency offset estimation based on the initial timing position $T_{coarse}$ determined by the initial timing estimation module and the determined PSS to obtain a Fractional Frequency Offset (FFO) estimation value $\hat{\epsilon}_f$; and a further timing estimation module configured to apply a frequency offset compensation to the sequence to be analyzed y obtained by the sequence obtaining module based on the IFO estimation value $\hat{\epsilon}$ determined by the initial timing estimation module and the FFO estimation value $\hat{\epsilon}_f$ determined by the initial frequency offset estimation module and perform a further timing estimation based on the initial timing position $T_{coarse}$ determined by the initial timing estimation module and the determined PSS to obtain a fine timing position $T_{fine}$, wherein n is a positive integer equal to or larger than 1.

Further, the receiver further comprises: a secondary sequence segment extraction module configured to extract a secondary sequence segment to be analyzed from the sequence to be analyzed y based on the fine timing position $T_{fine}$ determined by the further timing estimation module; and a Secondary Synchronization Sequence (SSS) detection module configured to apply a frequency offset compensation to the secondary sequence segment to be analyzed as extracted by secondary sequence segment extraction module the based on the IFO estimation value determined by the initial timing estimation module and the FFO estimation value $\hat{\epsilon}_f$ determined by the initial frequency offset estimation module and determine a Secondary Synchronization Sequence (SSS) corresponding to the secondary sequence segment to be analyzed and a timing position of a wireless data frame using a cross-correlation calculation, wherein m is a positive integer equal to or larger than 1.

Further, the receiver further comprises: a further frequency offset estimation module configured to perform a further frequency offset estimation based on the secondary sequence segment to be analyzed as extracted by secondary sequence segment extraction module and the SSS corresponding to the secondary sequence segment to be analyzed as determined by the SSS detection module to regenerate a FFO estimation value $\hat{\epsilon}_f$ and use the IFO estimation value $\hat{\epsilon}$ determined by the initial timing estimation module and the regenerated FFO estimation value $\hat{\epsilon}_f$ as final frequency offset estimation values.

Further, the sequence obtaining module comprises: a sliding extraction unit configured to extract from the received time domain signal a sequence having a sampling rate equal to a maximum bandwidth sampling rate and a length of $N_{buffer}$ using a sliding window; and a narrow-band filtering unit configured to apply a narrow-band filtering to the sequence having the length of $N_{buffer}$ as extracted by the sliding extraction unit to obtain the sequence to be analyzed y that is located at a center position of a transmission bandwidth and has a bandwidth of a predetermined value, wherein $N_{buffer}$ belongs to (half of wireless frame length, half of wireless frame length+one symbol length) and the predetermined value belongs to [1.08 MHz, 1.25 MHz].

Further, the initial timing estimation module comprises: a down-sampling unit configured to down-sample the sequence to be analyzed y by the factor of α to obtain the down-sampled sequence, where a is $2^n$; a candidate frequency offset compensation unit configured to apply a frequency offset compensation to the down-sampled sequence obtained by the down-sampling unit based on the n different predetermined IFO candidate values to obtain n IFO compensated down-sampled sequences; a cross-correlation calculation unit configured to perform a cross-correlation calculation based on the n IFO compensated down-sampled sequences obtained by the candidate frequency offset compensation unit and k time domain PSSs generated at the receiver to obtain k*n cross-correlation result sequences; a position determination unit configured to determine a maximum element $max_i$ in each of the cross-correlation result sequences obtained by the cross-correlation unit and a position $d_i$ corresponding to the maximum element $max_i$; a maximum selection unit configured to select one of the k*n maximum elements $max_i$ determined by the position determination unit that has a largest value, denoted as a largest element max; a largest detection unit configured to detect whether the largest element max is larger than a predetermined threshold $P_{th}$; and an initial estimation unit configured to determine, when the largest detection unit detects that the largest element max is larger than the predetermined $P_{th}$, the position $d_i$ corresponding to the largest element max as the initial timing position $T_{coarse}$, the predetermined IFO candidate value corresponding to the cross-correlation result sequence to which the largest element max belongs as the IFO estimation value $\hat{\epsilon}$, and the PSS corresponding to the cross-correlation result sequence to which the largest element max belongs as the PSS corresponding to the sequence to be analyzed y, wherein k is a positive integer equal to or larger than 1.

Further, the cross-correlation calculation unit is configured to assume the IFO compensated down-sampled sequence as $y_{compensate}$ and the time domain PSS as pss_time_downsampling, and perform the cross-correlation calculation in accordance with the following block-wise cross-correlation equation:

$$P(d) = \sum_{m=1}^{M} \left| \sum_{n=(m-1)L}^{mL-1} (y_{compensate}(n+d) \text{pss\_time\_downsampling}^*(n)) \right|^2,$$

$(N = ML)$ where M is a number of blocks, L is a length of a block, N is a length of the PSS, m is a block sequence number of a block and n is a sequence number within a block.

Further, the initial frequency offset estimation module comprises: an integral compensation unit configured to apply a frequency offset compensation to the sequence to be analyzed y based on the IFO estimation value $\hat{\epsilon}$ to obtain a frequency offset compensated sequence to be analyzed y; a primary sequence segment extraction unit configured to extract from the frequency offset compensated sequence to be analyzed y obtained by the integral compensation unit a primary sequence segment to be analyzed Rx_rss based on the initial timing position $T_{coarse}$; an initial frequency offset estimation unit configured to perform an initial frequency offset estimation based on the primary sequence segment to be analyzed Rx_rss as extracted by the primary sequence segment extraction unit and the determined PSS LocalPss to obtain the FFO estimation value $\hat{\epsilon}_f$ in accordance with:

$$\varepsilon_f = \frac{M}{2\pi} \arg \left\{ \sum_{m=1}^{M-1} \left[ \sum_{n=N(m-1)/M}^{Nm/M-1} (\text{Rx\_Pss}(n) LocalPss^*(n)) \right]^* \left[ \sum_{n=Nm/M}^{N(m+1)/M-1} (\text{Rx\_Pss}(n) LocalPss^*(n)) \right] \right\}$$

where M is a number of blocks, L is a length of a block, N is a length of the PSS, m is a block sequence number of a block and n is a sequence number within a block.

Further, the further timing estimation module comprises: a fractional compensation unit configured to apply a frequency offset compensation to the sequence to be analyzed y based on the IFO estimation value $\hat{\epsilon}$ and the FFO estimation value $\hat{\epsilon}_f$ to obtain a frequency offset compensated sequence to be analyzed y; an interval determination unit configured to determine a position interval $[T_{coarse}-R, T_{coarse}+R]$ from the frequency offset compensated sequence to be analyzed y obtained by the fractional compensation unit based on the initial timing position $T_{coarse}$; a sequence division unit configured to divide the frequency offset compensated sequence to be analyzed y into 2R+1 data sequences Rx_Search based on the position interval determined by the interval determination unit; a cross-correlation calculation unit configured to perform a cross-correlation calculation based on the 2R+1 data sequences Rx_Search and the determined PSS LocalPss to obtain 2R+1 cross-correlation result sequences; an element determination unit configured to determine a maximum element $pmax_i$ in each of the cross-correlation result sequences obtained by the cross-correlation calculation unit and a position $pd_i$ corresponding to the maximum element $pmax_i$; an element selection unit configured to select one of the 2R+1 maximum elements $pmax_i$ that has a largest value, denoted as a largest element pmax; and a further timing estimation unit configured to determine the position $pd_i$ corresponding to the maximum element pmax as the fine timing position $T_{fine}$, wherein R is a positive integer equal to or larger than 1.

Further, the secondary sequence segment extraction module comprises: a first calculation unit configured to calculate a start position $T_{SSS}$ of the secondary sequence segment to be analyzed based on a timing relationship between the PSS and the SSS and the fine timing position $T_{fine}$ in accordance with:

$T_{SSS} = T_{fine} - L_{symbol} - L_{CP}$;

a position determination unit configured to determine whether the start position $T_{SSS}$ is located within the sequence to be analyzed y; a first extraction unit configured to extract the secondary sequence segment to be analyzed based on the start position $T_{SSS}$ when it is determined that the start position $T_{SSS}$ is located within the sequence to be analyzed y; a second calculation unit configured to recalculate, when it is determined that the start position $T_{SSS}$ is located outside the sequence to be analyzed y, the start position $T_{SSS}$ in accordance with:

$T_{SSS} = T_{fine} - L_{symbol} - L_{CP} + L_{half\_of\_wireless\_frame}$;

a second extraction unit configured to extract the secondary sequence segment to be analyzed based on the recalculated start position $T_{SSS}$, where $T_{fine}$ is a sequence number of the start position of the PSS corresponding to the sequence to be analyzed y, $L_{symbol}$ is a length of a symbol, $L_{CP}$ is a length of a Cyclic Prefix (CP), and $L_{half\_of\_wireless\_frame}$ is a length of half of a wireless data frame.

Further, the SSS detection module comprises: a secondary sequence compensation unit configured to apply a frequency offset compensation to the secondary sequence segment to be analyzed based on the IFO estimation value $\hat{\epsilon}$ and the FFO estimation value $\hat{\epsilon}_f$ to obtain a frequency offset compensated secondary sequence segment to be analyzed Rx_Sss; a secondary sequence compensation unit configured to perform a cross-correlation calculation based on the frequency offset compensated secondary sequence segment to be analyzed Rx_Sss and m time domain SSSs generated at the receiver to obtain m cross-correlation result sequences; a correlation determination unit configured to determine a maximum element smax$_i$ in each of the cross-correlation result sequences and a position sd$_i$ corresponding to the maximum element smax$_i$; a correlation selection unit configured to select one of the m maximum elements smax$_i$ that has a largest value, denoted as a largest element smax; a secondary sequence determining unit configured to determine the SSS corresponding to the largest element smax as the SSS corresponding to the secondary sequence segment to be analyzed; and a data frame timing unit configured to determine the timing position of the wireless data frame based on a type of the SSS corresponding to the secondary sequence segment to be analyzed and the position sd$_i$ corresponding to the largest element smax, wherein m is a positive integer equal to or larger than 1.

Further, the further frequency offset estimation module is configured to: assume the secondary sequence segment to be analyzed as Rx_Sss and the SSS corresponding to the secondary sequence segment to be analyzed as LocalSss, and recalculate the FFO estimation value $\hat{\epsilon}_f$ in accordance with:

$$\varepsilon_f = \frac{M}{2\pi}\arg\left\{\sum_{m=1}^{M-1}\left[\sum_{n=N(m-1)/M}^{Nm/M-1}(Rx\_Sss(n)LocalSss^*(n))\right]^*\right.$$
$$\left.\left[\sum_{n=Nm/M}^{N(m+1)/M-1}(Rx\_Sss(n)LocalSss^*(n))\right]\right\}$$

where M is a number of blocks, L is a length of a block, N is a length of the PSS, m is a block sequence number of a block and n is a sequence number within a block; and use the IFO estimation value $\hat{\epsilon}$ and the regenerated FFO estimation value $\hat{\epsilon}_f$ as the final frequency offset estimation values.

According to a third aspect of the present invention, a communication system is provided. The communication system comprises a base station and at least one receiver according to the second aspect as described above or any further solutions thereof.

The solutions according to the embodiments of the present invention have the following advantages. The initial timing estimation is applied to the down-sampled sequence by means of IFO compensation. The result of the initial timing estimation is used as an input to the initial frequency offset estimation. The result of the initial frequency offset estimation is used an input to the further timing estimation. In this way, the frequency offset compensation and the timing synchronization can be combined with each other to achieve a time domain joint synchronization in downlink. It is possible solve the problem that the existing timing synchronization and frequency offset estimation schemes require a large amount of computation and are thus time-consuming. The computation complexity can be reduced by using the down-sampled sequence and the timing synchronization result and the frequency offset estimation result can be combined with each other to achieve an effect of fast synchronization with high synchronization accuracy.

BRIEF DESCRIPTION OF THE DRAWINGS

In order to illustrate the solutions according to the embodiments of the present application clearly, the figures used for description of the embodiments will be introduced briefly here. It is apparent to those skilled in the art that the figures described below only illustrate some embodiments of the present invention and other figures can be obtained from these figures without applying any inventive skills.

DETAILED DESCRIPTION OF THE EMBODIMENTS

In the following, the embodiments of the present invention will be described in further detail with reference to the figures, such that the objects, solutions and advantages of the present invention will become more apparent.

For the purpose of illustration, details related to a transmitter in the LTE system will be described first. According to the specifications related to LTE physical layer, the size of each of various fields in time domain can be represented in time units of $T_s$ which is defined as $T_s=1/(15000*2048)$ s. The length of one wireless data frame for uplinkdownlink transmission can be represented as $T_f=307200*T_s=10$ ms.

Figure 1:
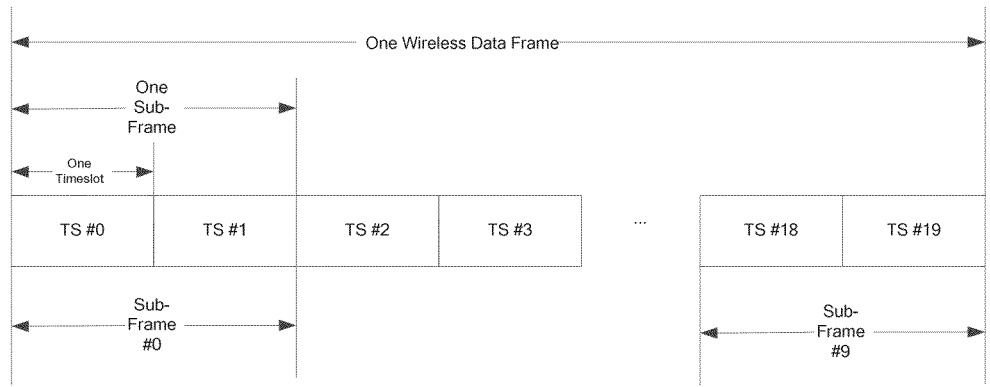
FIG. 1 is a schematic diagram showing a structure of a wireless data frame that can be applied in an embodiment of the present invention.

There are two types of wireless data frame structures supported by the LTE standard. FIG. 1 shows a wireless data frame structure which is suitable for the Frequency Division Duplex (FDD) mode and can be applied in the embodiment of the present invention. The wireless data frame consists of 20 time slots numbered as 0-19, respectively. These 20 time slots constitute 10 sub-frames numbered as 0-9, respectively. Here, the i-th sub-frame consists of the 2i-th and (2i+1)-th time slots.

Figure 2A:
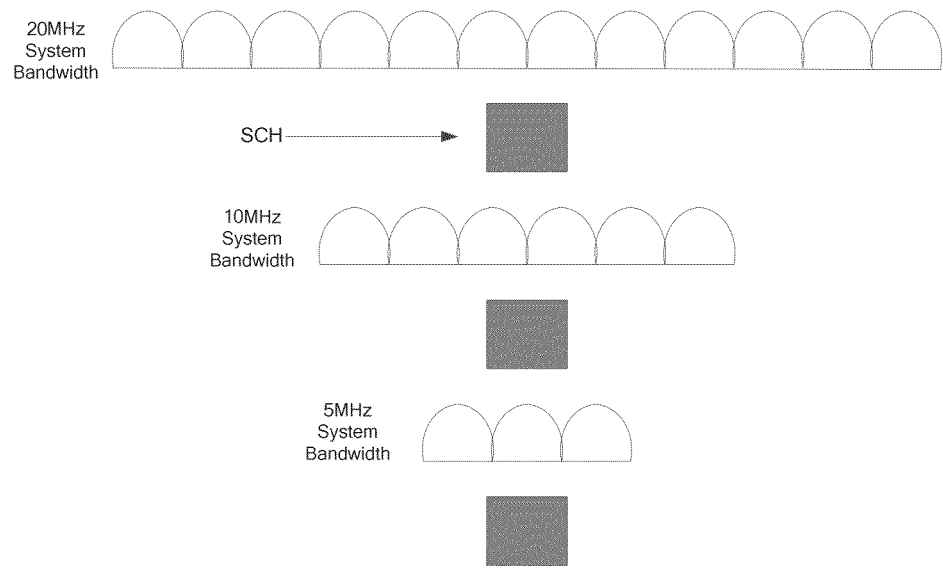
FIG. 2A is a schematic diagram showing a transmission position of a synchronization channel that can be applied in an embodiment of the present invention.

The synchronization channels in the LTE system adopt Hierarchical Synchronization Channel (HSC) architecture. That is, Synchronization Channels (SCHs) are divided into Primary Synchronization Channel (PSCH) and Secondary Synchronization Channel (SSCH). However, an SCH is always transmitted in a 1.25 MHz bandwidth at the center position of the system bandwidth, regardless of the downlink transmission bandwidth in the system and the reception bandwidth of a User Equipment (UE), as shown in FIG. 2A.

Figure 2B:
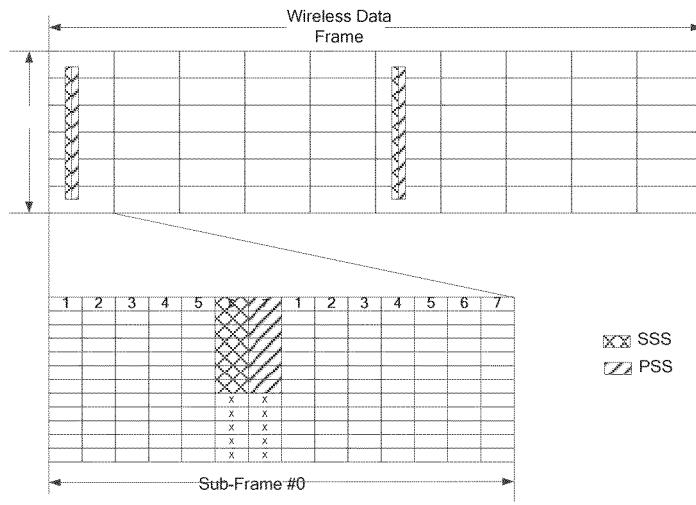
FIG. 2B is a schematic diagram showing time-domain and frequency-domain positions of PSS and SSS that can be applied in an embodiment of the present invention.

In each wireless data frame, each of the PSCH and the SSCH will be transmitted twice. The PSCH carries a Primary Synchronization Sequence (PSS) and the SSCH carries a Secondary Synchronization Sequence (SSS). The PSS is located at the last OFDM symbol block in time slots #0 and #10 and the SSS is located at the last but one OFDM symbol block in time slots #0 and #10. The PSS and the SSS are carried by 62 central sub-carriers in 6 Resource Blocks (RBs) in the middle of the system physical resources, with 5 sub-carriers unused on each side for reducing interference from adjacent channels. Hence, in fact the effective SCH signal is transmitted in a 1.08 MHz bandwidth at the center position of the system bandwidth. FIG. 2B shows the time-domain and frequency-domain positions of PSS and SSS in the wireless data frame structure shown in FIG. 1.

The LTE system defines 504 cells. Three cells constitute a group and there are 168 groups in total. The values of group numbers $N_{ID}^{(1)}$ range from 0 to 167 and the values of cell numbers $N_{ID}^{(2)}$ within a group range from 0 to 2. Accordingly, there are three types of PSSs each corresponding to one of the three cell numbers Nom) within a group. In other words, the cell number $N_{ID}^{(2)}$ within a group can be determined once the type of PSS is known. On the other hand, since the SSS is transmitted twice in a wireless frame (i.e., in sub-frames #0 and #5, respectively) and the two transmitted SSSs are different from each other, there are 168*2=336 groups of SSSs, of which 168 groups are transmitted in sub-frame #0 and the other 168 groups are transmitted in sub-frame #5. Thus, the cell group number $N_{ID}^{(1)}$ and thus the timing of the wireless data frame can be determined once the group the SSS belongs to is known.

That is, by detecting the PSCH, a receiver can obtain symbol timing synchronization information, frequency synchronization information, the cell number $N_{ID}^{(2)}$ within a group and other information required for detecting the SSCH. By detecting the SSCH, it can obtain wireless data frame timing synchronization information and the cell group number $N_{ID}^{(1)}$.

First Embodiment

Figure 3:
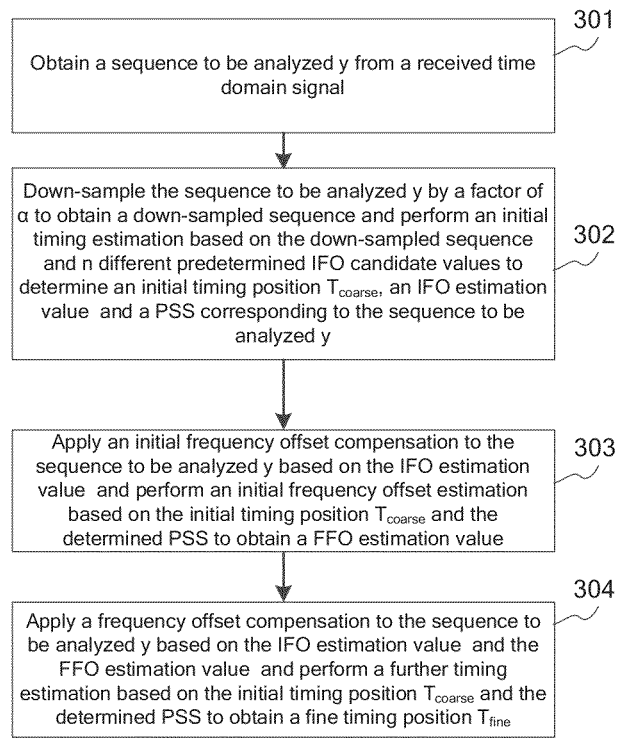
FIG. 3 is a flowchart illustrating a method for signal synchronization according to a first embodiment of the present invention.

Reference is now made to FIG. 3 which is a flowchart illustrating a method for signal synchronization according to a first embodiment of the present invention. This embodiment will be explained in connection with an example where the method for signal synchronization is applied in a receiver. Here the receiver can be a User Equipment (UE) (which can be a mobile phone used by a user). The transmitter corresponding to the receiver can be a base station. The method for signal synchronization includes the following steps.

At step 301, a sequence to be analyzed y is obtained from a received time domain signal.

At step 302, the sequence to be analyzed y is down-sampled by a factor of α to obtain a down-sampled sequence and an initial timing estimation is performed based on the down-sampled sequence and n different predetermined Integral Frequency Offset (IFO) candidate values to determine an initial timing position $T_{coarse}$, an IFO estimation value $\hat{\epsilon}$ and a Primary Synchronization Sequence (PSS) corresponding to the sequence to be analyzed y.

At step 303, an initial frequency offset compensation is applied to the sequence to be analyzed y based on the IFO estimation value $\hat{\epsilon}$ and an initial frequency offset estimation is performed based on the initial timing position $T_{coarse}$ and the determined PSS to obtain a Fractional Frequency Offset (FFO) estimation value $\hat{\epsilon}_f$.

At step 304, a frequency offset compensation is applied to the sequence to be analyzed y based on the IFO estimation value $\hat{\epsilon}$ and the FFO estimation value $\hat{\epsilon}_f$ and a further timing estimation is performed based on the initial timing position $T_{coarse}$ and the determined PSS to obtain a fine timing position $T_{fine}$.

Here, the fine timing position $T_{fine}$ is a fine timing position of an OFDM symbol block.

As discussed above, with the method for signal synchronization according to this embodiment, the initial timing estimation is applied to the down-sampled sequence by means of IFO compensation. The result of the initial timing estimation is used as an input to the initial frequency offset estimation. The result of the initial frequency offset estimation is used an input to the further timing estimation. In this way, the frequency offset compensation and the timing synchronization can be combined with each other to achieve a time domain joint synchronization in downlink. It is possible solve the problem that the existing timing synchronization and frequency offset estimation schemes require a large amount of computation and are thus time-consuming. The computation complexity can be reduced by using the down-sampled sequence and the timing synchronization result and the frequency offset estimation result can be combined with each other to achieve an effect of fast synchronization with high synchronization accuracy.

Second Embodiment

In the first embodiment as described above, only the OFDM symbol block synchronization is achieved. In the following detailed description, a second embodiment will be described, where the OFDM symbol block synchronization, the wireless data frame timing synchronization and the frequency offset estimation can be achieved at the same time. In general, the second embodiment can be divided into an initialization stage, an initial timing estimation stage, an initial frequency offset estimation stage, a further timing estimation stage, an SSS detection stage and a further frequency offset estimation stage. In the embodiment, the process of OFDM symbol block synchronization can be completed after the completion of the further timing estimation stage. The process of wireless data frame timing synchronization can be completed after the completion of the SSS detection stage.

The process of frequency offset estimation can be completed after the completion of the further frequency offset estimation stage.

Figure 4A:
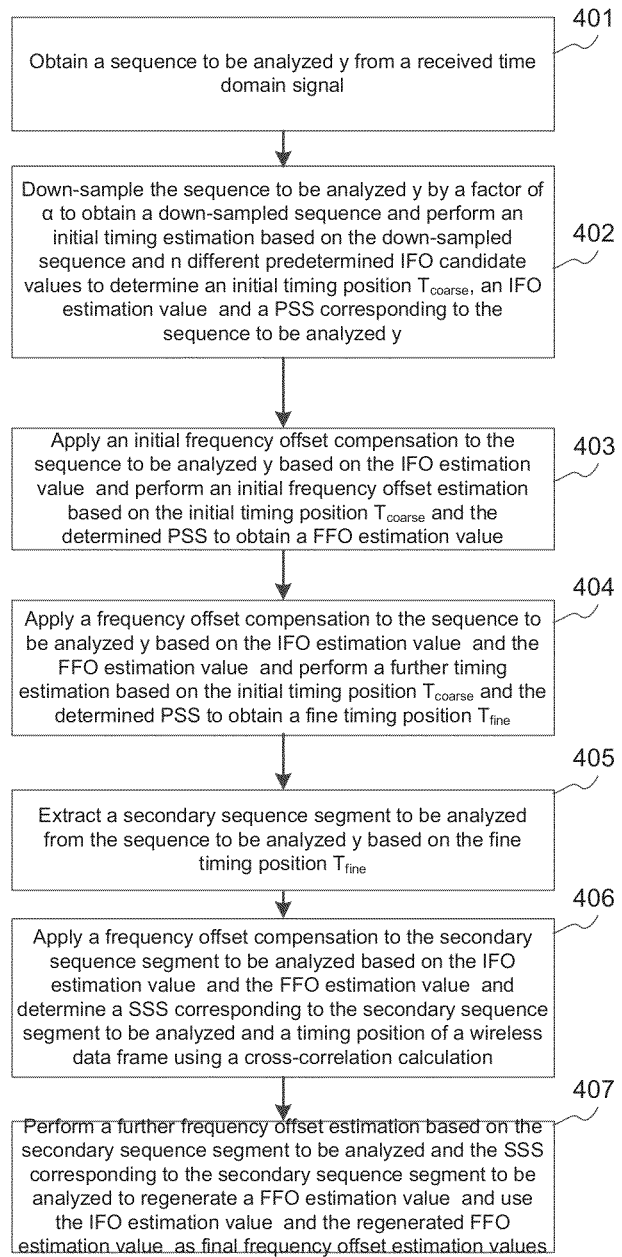
FIG. 4A is a flowchart illustrating a method for signal synchronization according to a second embodiment of the present invention.

More specifically, reference can be made to FIG. 4A, which is a flowchart illustrating a method for signal synchronization according to the second embodiment of the present invention. This embodiment will be explained in connection with an example where the method for signal synchronization is applied in a receiver. Here the receiver can be a User Equipment (UE) (which can be a mobile phone used by a user). The transmitter corresponding to the receiver can be a base station. The method for signal synchronization includes the following steps.

At step 401, a sequence to be analyzed y is obtained from a received time domain signal.

Figure 4B:
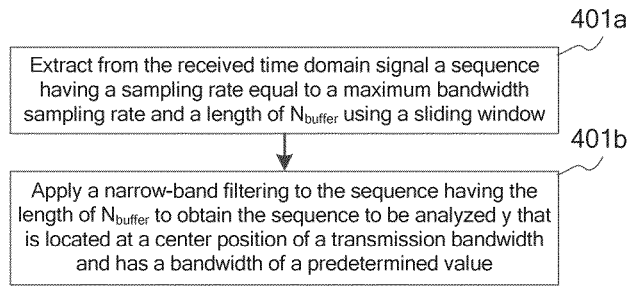
FIG. 4B is a flowchart illustrating an initialization process of the method for signal synchronization according to the second embodiment of the present invention.

The receiver extracts from the received time domain signal a signal of a predetermined length as the sequence to be analyzed y. First, the receiver can receive the time domain signal transmitted from the transmitter. Since the receiver does not know the system bandwidth in advance, it has to sample the received time domain signal at a sampling rate for the maximum bandwidth, i.e., sampling 2048 points for each OFDM symbol block. In particular, this step may include the following two sub-steps, as shown in FIG. 4B.

At 401a, a sequence having a sampling rate equal to a maximum bandwidth sampling rate and a length of $N_{buffer}$ is extracted from the received time domain signal using a sliding window.

First, the receiver extracts a sequence having a sampling rate equal to a maximum bandwidth sampling rate and a length of $N_{buffer}$ from the received time domain signal using a sliding window. That is, the sequence has a sampling rate of 2048 points per OFDM symbol block and a length of $N_{buffer}$. Here $N_{buffer}$ belongs to (half of wireless frame length, half of wireless frame length+one symbol length). Preferably, in this embodiment, $N_{buffer}$=half of wireless frame length+2047 points. The length of $N_{buffer}$ ensures that there is one, and only one, PSS in each sampled sequence. After the completion of the synchronization process for the currently extracted sequence, the receiver can go on extracting subsequent time domain signal using the sliding window, such that the synchronization process can continue.

At 401b, a narrow-band filtering is applied to the sequence having the length of $N_{buffer}$ to obtain the sequence to be analyzed y that is located at a center position of a transmission bandwidth and has a bandwidth of a predetermined value.

Since the synchronization channel is always transmitted at the center position of the system bandwidth, the receiver further applies a narrow-band filtering to the sequence having the length of $N_{buffer}$ to obtain the sequence to be analyzed y that is located at a center position of a transmission bandwidth and has a bandwidth of a predetermined value. Here the predetermined value belongs to [1.08 MHz, 1.25 MHz]. Preferably, in this embodiment, the predetermined value is 1.08 MHz.

At step 402, the sequence to be analyzed y is down-sampled by a factor of α to obtain a down-sampled sequence and an initial timing estimation is performed based on the down-sampled sequence and n different predetermined Integral Frequency Offset (IFO) candidate values to determine an initial timing position $T_{coarse}$, an IFO estimation value $\hat{\epsilon}$ and a Primary Synchronization Sequence (PSS) corresponding to the sequence to be analyzed y.

Figure 4C:
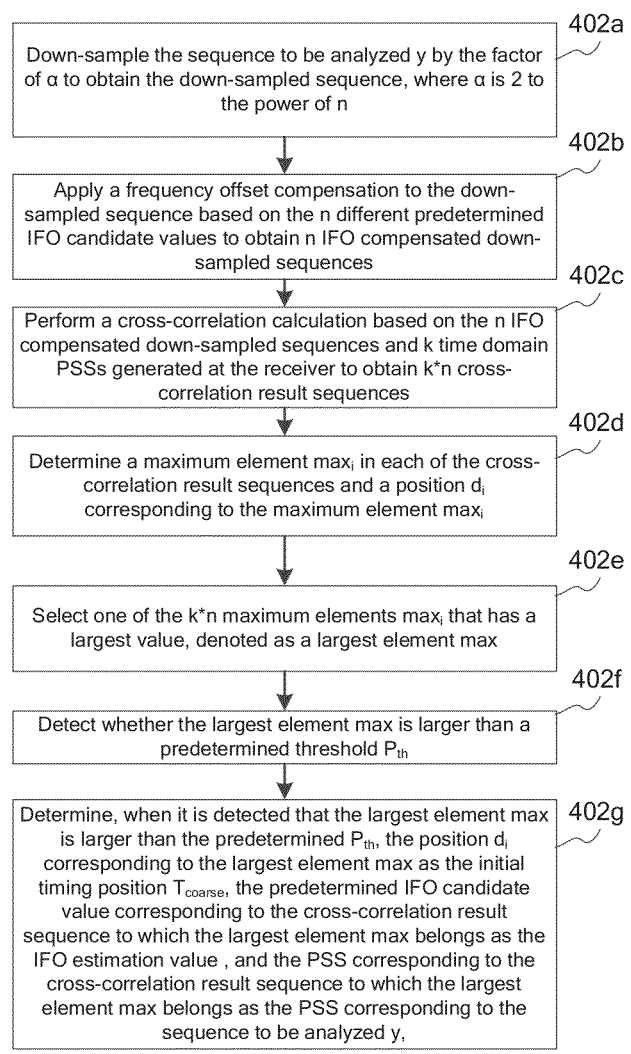
FIG. 4C is a flowchart illustrating an initial timing estimation process of the method for signal synchronization according to the second embodiment of the present invention.

After obtaining the sequence to be analyzed y, the receiver first performs an initial timing estimation for the sequence to be analyzed y. In order to account for computational complexity and accuracy of the timing, during the initial timing estimation process, the sequence to be analyzed y is down-sampled and then the initial timing estimation is performed based on the down-sampled sequence, so as to find a coarse synchronization position while reducing the computation load. That is, the receiver down-samples the sequence to be analyzed y by a factor of α to obtain a down-sampled sequence and performs an initial timing estimation based on the down-sampled sequence and n different predetermined Integral Frequency Offset (IFO) candidate values to determine an initial timing position $T_{coarse}$, an IFO estimation value $\hat{\epsilon}$ and a Primary Synchronization Sequence (PSS) corresponding to the sequence to be analyzed y. In particular, this step may include the following seven sub-steps, as shown in FIG. 4C.

At 402a, the sequence to be analyzed y is down-sampled by the factor of α to obtain the down-sampled sequence, where α is $2^n$.

First, the receiver down-samples the sequence to be analyzed y by the factor of a to obtain the down-sampled sequence, where α is $2^n$. The value of α can be typically 16 or 32.

At 402b, a frequency offset compensation is applied to the down-sampled sequence based on the n different predetermined IFO candidate values to obtain n IFO compensated down-sampled sequences.

The receiver can preset n different predetermined IFO candidate values. According to the specifications related to the LTE system, the maximum frequency offset should not exceed twice of the IFO. Thus, there can be five different predetermined IFO candidate values: {-2, -1, 0, 1, 2}. The receiver can apply a frequency offset compensation to the down-sampled sequence based on the five different predetermined IFO candidate values to obtain five IFO compensated down-sampled sequences $y_{compensate}$.

At 402c, a cross-correlation calculation is performed based on the n IFO compensated down-sampled sequences and k time domain PSSs generated at the receiver to obtain k*n cross-correlation result sequences.

The receiver also generates in advance k time domain PSSs, where k is a positive integer equal to or larger than 1. Since there are three PSSs according to the specifications related to the LTE system, the receiver can generate three PSSs in advance, denoted as pss_freq, each corresponding to one of three different cell numbers $N_{ID}^{(2)}$ within a group. Then, the pss_freq can be converted into a time-domain signal using IFFT transformation, denoted as pss_time_downsampling.

The receiver performs a cross-correlation calculation based on the five IFO compensated down-sampled sequences $y_{compensate}$ and three time domain PSSs pss_time_downsampling to obtain 15 cross-correlation result sequences.

According to the related specifications, a PSS is a signal having a constant amplitude in both time and frequency domains, i.e., $|x(n)|^2 \equiv A$. Thus, at the correct timing θ, the cross-correlation between a received signal r(n) and a locally generated replica of PSS is:

$$P(\theta) = A \left| \frac{\sin(\pi\varepsilon)}{\sin\left(\frac{\pi\varepsilon}{N}\right)} \right| + I$$

where I denotes a correlation result between a noise and the locally generated PSS. Thus, the larger the system frequency offset ε is, the smaller the timing correlation peak will be and thus the easier it will be buried by the noise, which degrades the timing performance. Hence, in order to reduce the impact of the frequency offset on the synchronization performance, preferably a block-wise cross-correlation is adopted herein. That is, assuming the IFO compensated down-sampled sequence as $y_{compensate}$ and the time domain PSS as pss_time_downsampling, the cross-correlation calculation is performed in accordance with the following block-wise cross-correlation equation:

$$P(d) = \sum_{m=1}^{M} \left| \sum_{n=(m-1)L}^{mL-1} (y_{compensate}(n+d)\text{pss\_time\_downsampling}(n)) \right|^2,$$

$$(N = ML)$$

where M is a number of blocks, L is a length of a block, N is a length of the PSS, m is a block sequence number of a block and n is a sequence number within a block. It can be seen from the equation that the cross-correlation is divided into M parts, the cross-correlation is calculated for each part independently and finally the powers of these parts are summed.

At 402d, a maximum element $\max_i$ in each of the cross-correlation result sequences and a position $d_i$ corresponding to the maximum element $\max_i$ are determined.

The length of each of the 15 cross-correlation result sequences, Correlation_Result, equals to half of the frame length. A maximum element $\max_i$ and a position $d_i$ corresponding to the maximum element $\max_i$ can be determined for each cross-correlation result sequence Correlation_Result. That is, there will be 15 maximum elements $\max_i$ and 15 positions $d_i$ corresponding to the respective maximum elements $\max_i$, where i is an integer equal to or larger than 1 and equal to or smaller than k*n.

At 402e, one of the k*n maximum elements $\max_i$ that has a largest value is selected, denoted as a largest element max.

For example, the receiver can select one of the 15 maximum elements $\max_i$ that has a largest value, denoted as a largest element max.

At 402f, it is detected whether the largest element max is larger than a predetermined threshold $P_{th}$.

Then, the receiver determines whether the largest element max is larger than a predetermined threshold $P_{th}$ by means of comparison. The value of max being smaller than $P_{th}$ indicates that the sequence to be analyzed y contains no PSS sequence, which in turn indicates that this data segment may contain noise only. In this case, the synchronization process fails and the sequence to be analyzed y will be removed from a buffer. The subsequent time-domain signal will be extracted and the synchronization process will be started again. On the other hand, the value of max being larger than $P_{th}$ indicates a successful synchronization.

At 402g, when it is detected that the largest element max is larger than the predetermined $P_{th}$, the position $d_i$ corresponding to the largest element max is determined as the initial timing position $T_{coarse}$, the predetermined IFO candidate value corresponding to the cross-correlation result sequence to which the largest element max belongs is determined as the IFO estimation value $\hat{\epsilon}$, and the PSS corresponding to the cross-correlation result sequence to which the largest element max belongs is determined as the PSS corresponding to the sequence to be analyzed y.

When the receiver determines that the largest element max is larger than the predetermined $P_{th}$, which indicates a successful synchronization, the position $d_i$ corresponding to the largest element max is determined as the initial timing position $T_{coarse}$, the predetermined IFO candidate value corresponding to the cross-correlation result sequence to which the largest element max belongs is determined as the IFO estimation value $\hat{\epsilon}$, and the PSS corresponding to the cross-correlation result sequence to which the largest element max belongs is determined as the PSS corresponding to the sequence to be analyzed y. For example, when the cross-correlation result sequence to which the largest element max belongs is obtained by performing the cross-correlation calculation based on the 1st type of PSS and the down-sampled sequence that is frequency offset compensated based on the IFO candidate value of −1, the sample points corresponding to the largest element max is determined as the initial timing position $T_{coarse}$, the IFO estimation value $\hat{\epsilon}$ for the sequence to be analyzed y is −1 and the corresponding PSS is the 1st type of PSS. At the same time, the cell number within a group can be determined to be 0.

At step 403, an initial frequency offset compensation is applied to the sequence to be analyzed y based on the IFO estimation value $\hat{\epsilon}$ and an initial frequency offset estimation is performed based on the initial timing position $T_{coarse}$ and the determined PSS to obtain a Fractional Frequency Offset (FFO) estimation value $\hat{\epsilon}_f$.

Figure 4D:
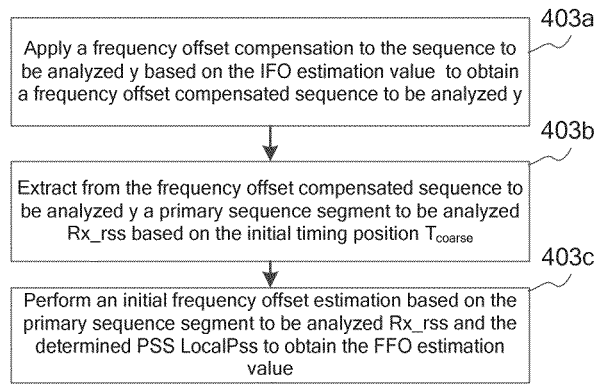
FIG. 4D is a flowchart illustrating an initial frequency offset estimation process of the method for signal synchronization according to the second embodiment of the present invention.

After completing the initial timing estimation stage, the receiver applies an initial frequency offset compensation to the sequence to be analyzed y. That is, the receiver applies a frequency offset compensation to the sequence to be analyzed y based on the IFO estimation value $\hat{\epsilon}$, extracts a primary sequence segment to be analyzed based on the initial timing position $T_{coarse}$, and performs an initial frequency offset estimation based on the primary sequence segment to be analyzed and the determined PSS to obtain the FFO estimation value $\hat{\epsilon}_f$. In particular, this step can include the following three sub-steps, as shown in FIG. 4D.

At 403a, a frequency offset compensation is applied to the sequence to be analyzed y based on the IFO estimation value $\hat{\epsilon}$ to obtain a frequency offset compensated sequence to be analyzed y;

The receiver applies a frequency offset compensation to the sequence to be analyzed y based on the IFO estimation value $\hat{\epsilon}$ obtained in the step 402.

At 403b, a primary sequence segment to be analyzed Rx_rss is extracted from the frequency offset compensated sequence to be analyzed y based on the initial timing position $T_{coarse}$.

The receiver extracts a primary sequence segment to be analyzed Rx_rss from the frequency offset compensated sequence to be analyzed y based on the initial timing position $T_{coarse}$. The primary sequence segment to be analyzed Rx_rss corresponding to the received time-domain PSS.

At 403c, an initial frequency offset estimation is performed based on the primary sequence segment to be analyzed Rx_rss and the determined PSS LocalPss to obtain the FFO estimation value $\hat{\epsilon}_f$ in accordance with:

$$\varepsilon_f = \frac{M}{2\pi} \arg \left\{ \sum_{m=1}^{M-1} \left[ \sum_{n=N(m-1)/M}^{Nm/M-1} (\text{Rx\_Pss}(n) LocalPss^*(n)) \right]^* \left[ \sum_{n=Nm/M}^{N(m+1)/M-1} (\text{Rx\_Pss}(n) LocalPss^*(n)) \right] \right\}$$

where M is a number of blocks, L is a length of a block, N is a length of the PSS, m is a block sequence number of a block and n is a sequence number within a block. The determined PSS LocalPss is the PSS corresponding to the sequence to be analyzed y as determined in the step 402.

At step 404, a frequency offset compensation is applied to the sequence to be analyzed y based on the IFO estimation value $\hat{\epsilon}$ and the FFO estimation value $\hat{\epsilon}_f$ and a further timing estimation is performed based on the initial timing position $T_{coarse}$ and the determined PSS to obtain a fine timing position $T_{fine}$.

Figure 4E:
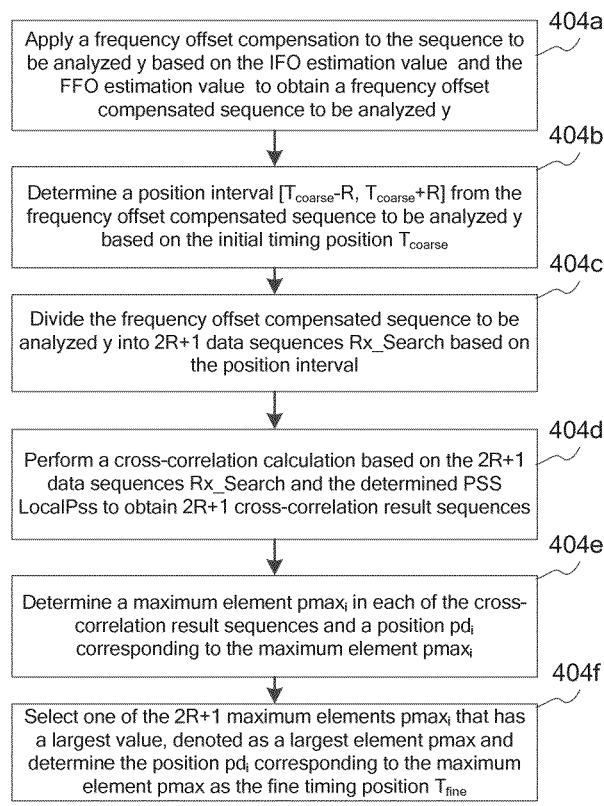
FIG. 4E is a flowchart illustrating a further timing estimation process of the method for signal synchronization according to the second embodiment of the present invention.

After completing the initial frequency offset estimation stage, the receiver applies a frequency offset compensation to the sequence to be analyzed y. That is, the receiver applies a frequency offset compensation to the sequence to be analyzed y based on the IFO estimation value $\hat{\epsilon}$ and the FFO estimation value $\hat{\epsilon}_f$ and performs a further timing estimation based on the initial timing position $T_{coarse}$ and the determined PSS to obtain a fine timing position $T_{fine}$. In particular, this step can include the following six sub-steps, as shown in FIG. 4E.

At 404a, a frequency offset compensation is applied to the sequence to be analyzed y based on the IFO estimation value $\hat{\epsilon}$ and the FFO estimation value $\hat{\epsilon}_f$ to obtain a frequency offset compensated sequence to be analyzed y.

The receiver applies a frequency offset compensation to the sequence to be analyzed y based on the IFO estimation value $\hat{\epsilon}$ determined in the step 402 and the FFO estimation value $\hat{\epsilon}_f$ determined in the step 403 to obtain a frequency offset compensated sequence to be analyzed y.

At 404b, a position interval $[T_{coarse}-R, T_{coarse}+R]$ is determined from the frequency offset compensated sequence to be analyzed y based on the initial timing position $T_{coarse}$.

The coarse start position can be determined in the frequency offset compensated sequence to be analyzed y based on the initial timing position $T_{coarse}$. In this sub-step, it is required to search both sides of the coarse start position for the fine start position. Hence, the receiver can determine a position interval $[T_{coarse}-R, T_{coarse}+R]$ from the frequency offset compensated sequence to be analyzed y based on the initial timing position $T_{coarse}$, where R is a positive integer equal to or larger than 1 and can be the length of a long CP.

At 404c, the frequency offset compensated sequence to be analyzed y is divided into 2R+1 data sequences Rx_Search based on the position interval.

Assuming that the individual sample points in the sequence to be analyzed y are numbered with a starting sequence number of 1, 2R+1 sequences each having a length of 2048 points can be obtained by moving, sample point by sample point, over the position interval $[T_{coarse}-R, T_{coarse}+R]$ ad determined in the previous sub-step.

At 404d, a cross-correlation calculation is performed based on the 2R+1 data sequences Rx_Search and the determined PSS LocalPss to obtain 2R+1 cross-correlation result sequences.

Similar to the cross-correlation process in the above step 402c, a cross-correlation calculation is performed based on the 2R+1 data sequences Rx_Search and the determined PSS LocalPss to obtain 2R+1 cross-correlation result sequences in accordance with:

$$P(d) = \sum_{m=1}^{M} \left| \sum_{n=(m-1)L}^{mL-1} Rx\_Search(n+d) LocalPss^*(n) \right|^2$$

$$N = ML$$

where M is a number of blocks, L is a length of a block, N is a length of the PSS, m is a block sequence number of a block and n is a sequence number within a block.

At 404e, a maximum element $pmax_i$ in each of the cross-correlation result sequences and a position $pd_i$ corresponding to the maximum element $pmax_i$ are determined.

At 404f, one of the 2R+1 maximum elements $pmax_i$ that has a largest value is selected, denoted as a largest element pmax. The position $pd_i$ corresponding to the maximum element pmax is determined as the fine timing position $T_{fine}$.

With the above process, the synchronization of the OFDM symbol block is achieved. The timing position of the OFDM symbol block can be determined by the fine timing position $T_{fine}$.

At step 405, a secondary sequence segment to be analyzed is extracted from the sequence to be analyzed y based on the fine timing position $T_{fine}$.

Figure 4F:
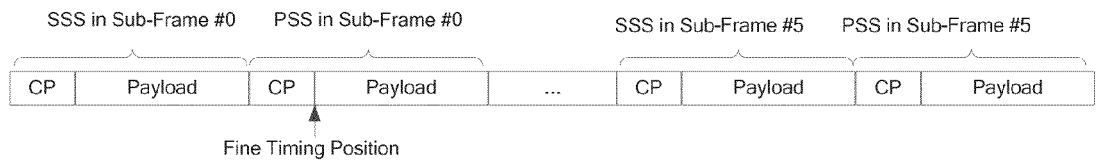
FIG. 4F is a schematic diagram showing a relative timing relationship between SSS and PSS according to the second embodiment of the present invention.
Figure 4G:
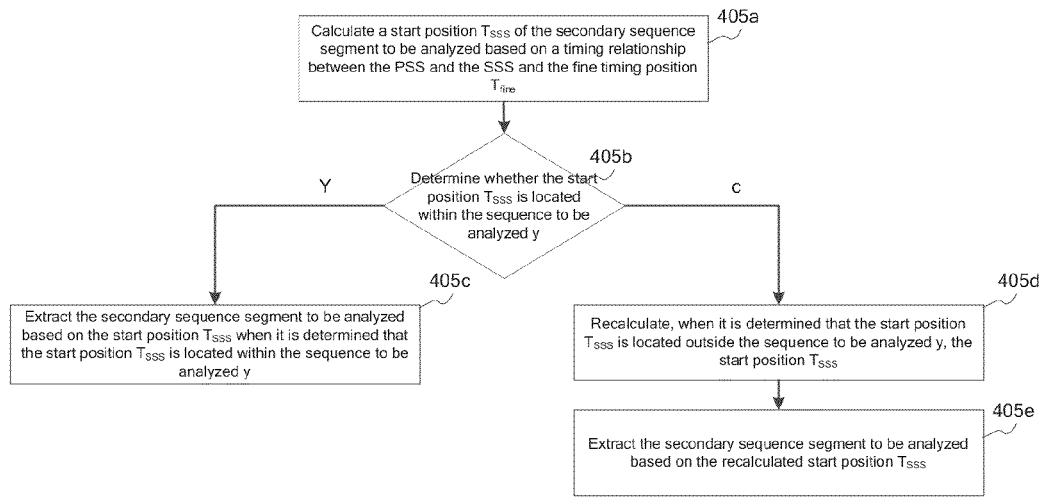
FIG. 4G is a flowchart illustrating a part of an SSS detection process of the method for signal synchronization according to the second embodiment of the present invention.

After completing the further timing estimation process, the receiver starts the SSS detection. In this process, the receiver can extract a secondary sequence segment to be analyzed from the sequence to be analyzed y based on a timing relationship between the PSS and the SSS and the fine timing position $T_{fine}$. That is, first the receiver needs to extract the received SSS, referred to as a secondary sequence segment to be analyzed, from the sequence to be analyzed y. Since the length of the sequence to be analyzed y is slightly longer than half of the frame length, it can be seen from FIG. 2B and FIG. 4F that, in a sequence having a length equal to half of the frame length, there are two possible timing relationships between the SSS and the PSS: the SSS being adjacent to the PSS and located in the previous symbol of the PSS; or the SSS and the PSS are separated by about half frame. Thus, the step of extracting a secondary sequence segment to be analyzed from the sequence to be analyzed y can include the following five sub-steps, as shown in FIG. 4G.

At step 405a, a start position $T_{SSS}$ of the secondary sequence segment to be analyzed is calculated based on a timing relationship between the PSS and the SSS and the fine timing position $T_{fine}$ in accordance with:

$$T_{SSS} = T_{fine} - L_{symbol} - L_{CP}.$$

First, assuming that the relationship between the SSS and the PSS is that they are adjacent to each other, then the timing relationship between the SSS and the PSS shall comply with the above equation. Here, $T_{fine}$ is the sequence number of that start position of the PSS corresponding to the sequence to be analyzed y, $L_{symbol}$ is the length of a symbol, and $L_{CP}$ is the length of a CP.

At 405b, it is determined whether the start position $T_{SSS}$ is located within the sequence to be analyzed y.

The determination as to whether the calculated start position $T_{SSS}$ is located within the sequence to be analyzed y can be made by determining whether the sequence number of $T_{SSS}$ is smaller than the sequence number of the first sample point in the sequence to be analyzed y. Since the sequence number of the first sample point in the sequence to be analyzed y is typically 1, it is only required to determine whether the sequence number of $T_{SSS}$ is smaller than 1.

At 405c, the secondary sequence segment to be analyzed is extracted based on the start position $T_{SSS}$ when it is determined that the start position $T_{SSS}$ is located within the sequence to be analyzed y.

If it is determined that the start position $T_{SSS}$ is located within the sequence to be analyzed y, the above assumption is correct and thus the secondary sequence segment to be analyzed can be extracted based on the start position $T_{SSS}$.

At 405d, when it is determined that the start position $T_{SSS}$ is located outside the sequence to be analyzed y, the start position $T_{SSS}$ is recalculated in accordance with:

$$T_{SSS}=T_{fine}-L_{symbol}-L_{CP}+L_{half\_of\_wireless\_frame}.$$

When it is determined that the start position $T_{SSS}$ is located outside the sequence to be analyzed y, the above assumption is incorrect and thus the timing relationship between the SSS and the PSS shall comply with the other case. Accordingly, the start position $T_{SSS}$ is recalculated in accordance with the other case. In the above equation, $L_{half\_of\_wireless\_frame}$ denotes the length of half of a wireless data frame.

At 405e, the secondary sequence segment to be analyzed is extracted based on the recalculated start position $T_{SSS}$.

By far, the secondary sequence segment to be analyzed, i.e., the received SSS, can be extracted from the sequence to be analyzed y.

At step 406, a frequency offset compensation is applied to the secondary sequence segment to be analyzed based on the IFO estimation value $\hat{\epsilon}$ and the FFO estimation value $\hat{\epsilon}_f$, and a Secondary Synchronization Sequence (SSS) corresponding to the secondary sequence segment to be analyzed and a timing position of a wireless data frame are determined using a cross-correlation calculation.

Figure 4H:
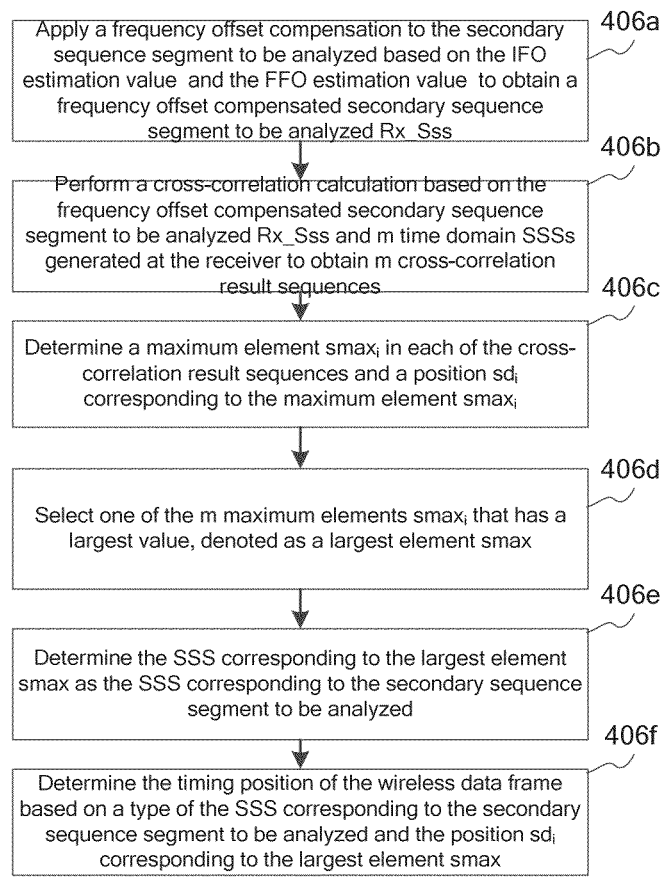
FIG. 4H is a flowchart illustrating another part of an SSS detection process of the method for signal synchronization according to the second embodiment of the present invention.

After extracting the secondary sequence segment to be analyzed, the receiver applies a frequency offset compensation to the secondary sequence segment to be analyzed based on the IFO estimation value and the FFO estimation value $\hat{\epsilon}_f$, performs a cross-correlation based on the frequency offset compensated secondary sequence segment and m time-domain SSSs generated at the receiver, and determines an SSS corresponding to the secondary sequence segment to be analyzed and a timing position of a wireless data frame based on the largest element in the cross-correlation calculation result. At the same time, the cell group number $N_{ID}^{(1)}$ based on the SSS corresponding to the secondary sequence segment to be analyzed. In particular, this step can include the following six sub-steps, as shown in FIG. 4H.

At 406a, a frequency offset compensation is applied to the secondary sequence segment to be analyzed based on the IFO estimation value $\hat{\epsilon}$ and the FFO estimation value $\hat{\epsilon}_f$ to obtain a frequency offset compensated secondary sequence segment to be analyzed Rx_Sss.

At 406b, a cross-correlation calculation is performed based on the frequency offset compensated secondary sequence segment to be analyzed Rx_Sss and m time domain SSSs generated at the receiver to obtain m cross-correlation result sequences.

The receiver can generate in advance m time domain SSSs, where m is a positive integer equal to or larger than 1. In this embodiment, m=336.

At 406c, a maximum element $smax_i$ in each of the cross-correlation result sequences and a position $sd_i$ corresponding to the maximum element $smax_i$ are determined.

At 406d, one of the m maximum elements $smax_i$ that has a largest value is selected, denoted as a largest element smax.

At 406e, the SSS corresponding to the largest element smax is determined as the SSS corresponding to the secondary sequence segment to be analyzed.

Once the SSS corresponding to the secondary sequence segment to be analyzed is determined, the corresponding cell group number $N_{ID}^{(1)}$ can be determined.

At 406f, the timing position of the wireless data frame is determined based on a type of the SSS corresponding to the secondary sequence segment to be analyzed and the position $sd_i$ corresponding to the largest element smax.

It can be determined whether the position $sd_i$ corresponding to the largest element smax is located in sub-frame #0 or sub-frame #5 based on the type of the SSS corresponding to the secondary sequence segment to be analyzed, thereby determining the position of the frame head of the wireless data frame and obtaining the timing position of the wireless data frame.

At 407, a further frequency offset estimation is performed based on the secondary sequence segment to be analyzed and the SSS corresponding to the secondary sequence segment to be analyzed to regenerate a FFO estimation value $\hat{\epsilon}_f$ and the IFO estimation value $\hat{\epsilon}$ and the regenerated FFO estimation value $\hat{\epsilon}_f$ are used as final frequency offset estimation values.

After the SSS detection, the receiver performs a further frequency offset estimation.

In particular, assuming the secondary sequence segment to be analyzed as Rx_Sss and the SSS corresponding to the secondary sequence segment to be analyzed as LocalSss, the FFO estimation value $\hat{\epsilon}_f$ can be recalculated in accordance with:

$$\varepsilon_f = \frac{M}{2\pi}\arg\left\{\sum_{m=1}^{M-1}\left[\sum_{n=N(m-1)/M}^{Nm/M-1}(Rx\_Sss(n)LocalSss^*(n))\right]^*\right.$$
$$\left.\left[\sum_{n=Nm/M}^{N(m+1)/M-1}(Rx\_Sss(n)LocalSss^*(n))\right]\right\}$$

where M is a number of blocks, L is a length of a block, N is a length of the PSS, m is a block sequence number of a block and n is a sequence number within a block.

Then, the IFO estimation value $\hat{\epsilon}$ and the regenerated FFO estimation value $\hat{\epsilon}_f$ are used as the final frequency offset estimation values.

As discussed above, with the method for signal synchronization according to this embodiment, the initial timing estimation is applied to the down-sampled sequence with IFO compensation. The result of the initial timing estimation is used as an input to the initial frequency offset estimation. The result of the initial frequency offset estimation is used as an input to the further timing estimation. In this way, the frequency offset compensation and the timing synchronization can be combined with each other to achieve a time domain joint synchronization in downlink. It is possible solve the problem that the existing timing synchronization and frequency offset estimation schemes require a large amount of computation and are thus time-consuming. The computation complexity can be reduced by using the down-sampled sequence and the timing synchronization result and the frequency offset estimation result can be combined with each other to achieve an effect of fast synchronization with high synchronization accuracy. Further, the result of the initial timing estimation and the result of the initial frequency offset estimation are used as an input to the further timing estimation and the result of the initial timing estimation and the result of the further timing estimation are in turn used as an input to the further frequency offset estimation, such that the frequency offset compensation and the timing synchronization can be further combined with each other to achieve a time domain joint synchronization in downlink. It is possible to further improve the calculation efficiency of the synchronization process while ensuring the synchronization accuracy.

Figure 5:
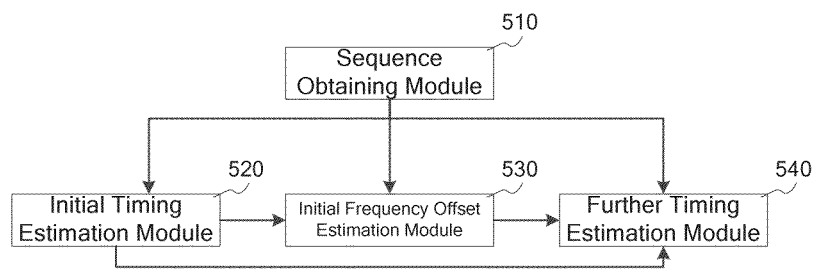
FIG. 5 is a block diagram showing a structure of a receiver according to a third embodiment of the present invention.

Reference is now made to FIG. 5, which is a block diagram showing a structure of a receiver according to a third embodiment of the present invention. The receiver includes: a sequence obtaining module 510, an initial timing estimation module 520, an initial frequency offset estimation module 530 and a further timing estimation module 540.

The sequence obtaining module 510 is configured to obtain a sequence to be analyzed y from a received time domain signal.

The initial timing estimation module 520 is configured to down-sample the sequence to be analyzed y as obtained by the sequence obtaining module 510 by a factor of α to obtain a down-sampled sequence and perform an initial timing estimation based on the down-sampled sequence and n different predetermined Integral Frequency Offset (IFO) candidate values to determine an initial timing position $T_{coarse}$, an IFO estimation value $\hat{\epsilon}$ and a Primary Synchronization Sequence (PSS) corresponding to the sequence to be analyzed y.

The initial frequency offset estimation module 530 is configured to apply an initial frequency offset compensation to the sequence to be analyzed y as obtained by the sequence obtaining module 510 based on the IFO estimation value $\hat{\epsilon}$ determined by the initial timing estimation module 520 and perform an initial frequency offset estimation based on the initial timing position $T_{coarse}$ determined by the initial timing estimation module 520 and the determined PSS to obtain a Fractional Frequency Offset (FFO) estimation value $\hat{\epsilon}_f$.

The further timing estimation module 540 is configured to apply a frequency offset compensation to the sequence to be analyzed y as obtained by the sequence obtaining module 510 based on the IFO estimation value $\hat{\epsilon}$ determined by the initial timing estimation module 520 and the FFO estimation value $\hat{\epsilon}_f$ determined by the initial frequency offset estimation module 530 and perform a further timing estimation based on the initial timing position $T_{coarse}$ determined by the initial timing estimation module and the determined PSS to obtain a fine timing position $T_{fine}$, wherein n is a positive integer equal to or larger than 1.

As discussed above, with the receiver according to this embodiment, the initial timing estimation is applied to the down-sampled sequence by means of IFO compensation. The result of the initial timing estimation is used as an input to the initial frequency offset estimation. The result of the initial frequency offset estimation is used an input to the further timing estimation. In this way, the frequency offset compensation and the timing synchronization can be combined with each other to achieve a time domain joint synchronization in downlink. It is possible solve the problem that the existing timing synchronization and frequency offset estimation schemes require a large amount of computation and are thus time-consuming. The computation complexity can be reduced by using the down-sampled sequence and the timing synchronization result and the frequency offset estimation result can be combined with each other to achieve an effect of fast synchronization with high synchronization accuracy.

Figure 6A:
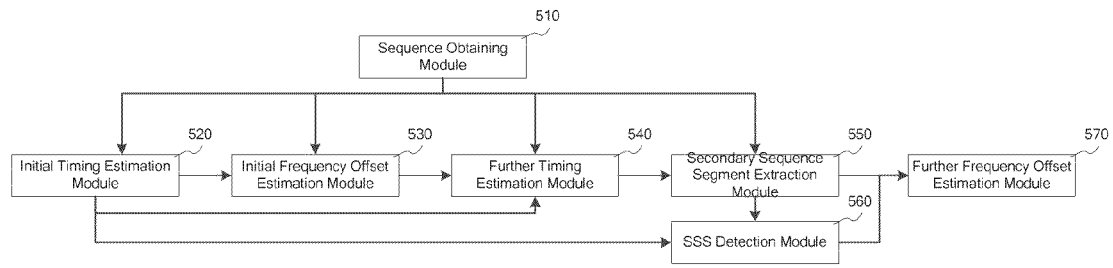
FIGS. 6A-6G are block diagrams showing a structure of a receiver according to a fourth embodiment of the present invention.

Reference is now made to FIG. 6A, which is a block diagram showing a structure of a receiver according to a fourth embodiment of the present invention. The receiver includes: a sequence obtaining module 510, an initial timing estimation module 520, an initial frequency offset estimation module 530, a further timing estimation module 540, a secondary sequence segment extraction module 550, a Secondary Synchronization Sequence (SSS) detection module 560 and a further frequency offset estimation module 570.

The sequence obtaining module 510 is configured to obtain a sequence to be analyzed y from a received time domain signal.

The initial timing estimation module 520 is configured to down-sample the sequence to be analyzed y as obtained by the sequence obtaining module 510 by a factor of a to obtain a down-sampled sequence and perform an initial timing estimation based on the down-sampled sequence and n different predetermined Integral Frequency Offset (IFO) candidate values to determine an initial timing position $T_{coarse}$, an IFO estimation value $\hat{\epsilon}$ and a Primary Synchronization Sequence (PSS) corresponding to the sequence to be analyzed y.

The initial frequency offset estimation module 530 is configured to apply an initial frequency offset compensation to the sequence to be analyzed y as obtained by the sequence obtaining module 510 based on the IFO estimation value $\hat{\epsilon}$ determined by the initial timing estimation module 520 and perform an initial frequency offset estimation based on the initial timing position $T_{coarse}$ determined by the initial timing estimation module 520 and the determined PSS to obtain a Fractional Frequency Offset (FFO) estimation value $\hat{\epsilon}_f$.

The further timing estimation module 540 is configured to apply a frequency offset compensation to the sequence to be analyzed y as obtained by the sequence obtaining module 510 based on the IFO estimation value $\hat{\epsilon}$ determined by the initial timing estimation module 520 and the FFO estimation value $\hat{\epsilon}_f$ determined by the initial frequency offset estimation module 530 and perform a further timing estimation based on the initial timing position $T_{coarse}$ determined by the initial timing estimation module and the determined PSS to obtain a fine timing position $T_{fine}$, wherein n is a positive integer equal to or larger than 1.

The secondary sequence segment extraction module 550 is configured to extract a secondary sequence segment to be analyzed from the sequence to be analyzed y based on the fine timing position $T_{fine}$ determined by the further timing estimation module 540.

The Secondary Synchronization Sequence (SSS) detection module 560 is configured to apply a frequency offset compensation to the secondary sequence segment to be analyzed as extracted by secondary sequence segment extraction module 550 the based on the IFO estimation value $\hat{\epsilon}$ determined by the initial timing estimation module 520 and the FFO estimation value $\hat{\epsilon}_f$ determined by the initial frequency offset estimation module 530 and determine a Secondary Synchronization Sequence (SSS) corresponding to the secondary sequence segment to be analyzed and a timing position of a wireless data frame using a cross-correlation calculation, wherein m is a positive integer equal to or larger than 1.

The further frequency offset estimation module 570 is configured to perform a further frequency offset estimation based on the secondary sequence segment to be analyzed as extracted by secondary sequence segment extraction module 550 and the SSS corresponding to the secondary sequence segment to be analyzed as determined by the SSS detection module 560 to regenerate a FFO estimation value $\hat{\epsilon}_f$ and use the IFO estimation value $\hat{\epsilon}$ as determined by the initial timing estimation module 520 and the regenerated FFO estimation value $\hat{\epsilon}_f$ as final frequency offset estimation values.

Figure 6B:
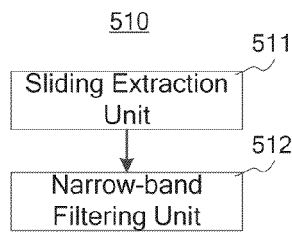

In particular, the sequence obtaining module 510 includes a sliding extraction unit 511 and a narrow-band filtering unit 512, as shown in FIG. 6B.

The sliding extraction unit 511 is configured to extract from the received time domain signal a sequence having a sampling rate equal to a maximum bandwidth sampling rate and a length of $N_{buffer}$ using a sliding window.

The narrow-band filtering unit 512 is configured to apply a narrow-band filtering to the sequence having the length of $N_{buffer}$ as extracted by the sliding extraction unit 511 to obtain the sequence to be analyzed y that is located at a center position of a transmission bandwidth and has a bandwidth of a predetermined value. Here $N_{buffer}$ belongs to (half of wireless frame length, half of wireless frame length+one symbol length) and the predetermined value belongs to [1.08 MHz, 1.25 MHz].

Figure 6C:
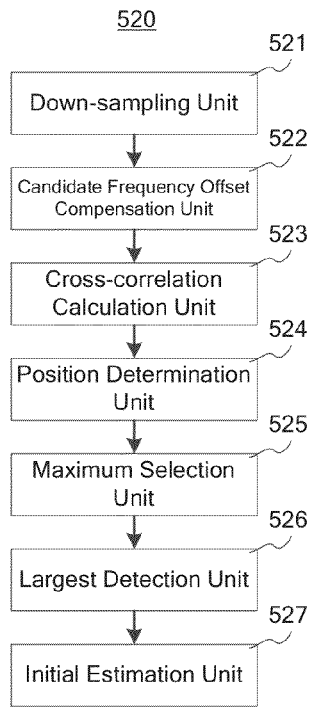

In particular, the initial timing estimation module 520 includes a down-sampling unit 521, a candidate frequency offset compensation unit 522, a cross-correlation calculation unit 523, a position determination unit 524, a maximum selection unit 525, a largest detection unit 526 and an initial estimation unit 527, as shown in FIG. 6C.

The down-sampling unit 521 is configured to down-sample the sequence to be analyzed y by the factor of a to obtain the down-sampled sequence, where a is $2^n$.

The candidate frequency offset compensation unit 522 is configured to apply a frequency offset compensation to the down-sampled sequence as obtained by the down-sampling unit 521 based on the n different predetermined IFO candidate values to obtain n IFO compensated down-sampled sequences.

The cross-correlation calculation unit 523 is configured to perform a cross-correlation calculation based on the n IFO compensated down-sampled sequences obtained by the candidate frequency offset compensation unit 522 and k time domain PSSs generated at the receiver to obtain k*n cross-correlation result sequences.

The position determination unit 524 is configured to determine a maximum element $max_i$ in each of the cross-correlation result sequences as obtained by the cross-correlation unit 523 and a position $d_i$ corresponding to the maximum element $max_i$.

The maximum selection unit 525 is configured to select one of the k*n maximum elements $max_i$ as determined by the position determination unit 524 that has a largest value, denoted as a largest element max.

The largest detection unit 526 is configured to detect whether the largest element max as selected by the maximum selection unit 525 is larger than a predetermined threshold $P_{th}$.

The initial estimation unit 527 is configured to determine, when the largest detection unit 526 detects that the largest element max is larger than the predetermined $P_{th}$, the position $d_i$ corresponding to the largest element max as the initial timing position $T_{coarse}$, the predetermined IFO candidate value corresponding to the cross-correlation result sequence to which the largest element max belongs as the IFO estimation value $\hat{\epsilon}$, and the PSS corresponding to the cross-correlation result sequence to which the largest element max belongs as the PSS corresponding to the sequence to be analyzed y, wherein k is a positive integer equal to or larger than 1.

Further, the cross-correlation calculation unit 523 is configured to assume the IFO compensated down-sampled sequence as $y_{compensate}$ and the time domain PSS as $pss\_time\_downsampling$, and perform the cross-correlation calculation in accordance with the following block-wise cross-correlation equation:

$$P(d) = \sum_{m=1}^{M} \left| \sum_{n=(m-1)L}^{mL-1} (y_{compensate}(n+d) \text{pss\_time\_downsampling}(n)) \right|^2 ,$$

$$(N = ML)$$

where M is a number of blocks, L is a length of a block, N is a length of the PSS, m is a block sequence number of a block and n is a sequence number within a block.

Figure 6D:
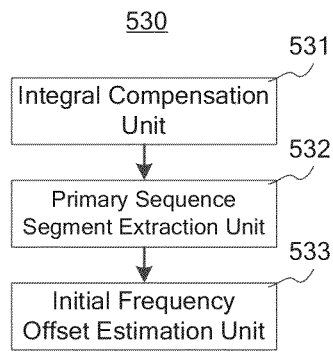

In particular, the initial frequency offset estimation module 530 includes: an integral compensation unit 531, a primary sequence segment extraction unit 532 and an initial frequency offset estimation unit 533, as shown in FIG. 6D.

The integral compensation unit 531 is configured to apply a frequency offset compensation to the sequence to be analyzed y based on the IFO estimation value $\hat{\epsilon}$ determined by the initial timing estimation module 520 to obtain a frequency offset compensated sequence to be analyzed y.

The primary sequence segment extraction unit 532 is configured to extract from the frequency offset compensated sequence to be analyzed y as obtained by the integral compensation unit 531 a primary sequence segment to be analyzed Rx_rss based on the initial timing position $T_{coarse}$ determined by the initial timing estimation module 520.

The initial frequency offset estimation unit 533 is configured to perform an initial frequency offset estimation based on the primary sequence segment to be analyzed Rx_rss as extracted by the primary sequence segment extraction unit 532 and the determined PSS LocalPss to obtain the FFO estimation value $\hat{\epsilon}_f$ in accordance with:

$$\varepsilon_f = \frac{M}{2\pi} \arg\left\{ \sum_{m=1}^{M-1} \left[ \sum_{n=N(m-1)/M}^{Nm/M-1} (\text{Rx\_Pss}(n) LocalPss^*(n)) \right]^* \left[ \sum_{n=Nm/M}^{N(m+1)/M-1} (\text{Rx\_Pss}(n) LocalPss^*(n)) \right] \right\}$$

where M is a number of blocks, L is a length of a block, N is a length of the PSS, m is a block sequence number of a block and n is a sequence number within a block.

Figure 6E:
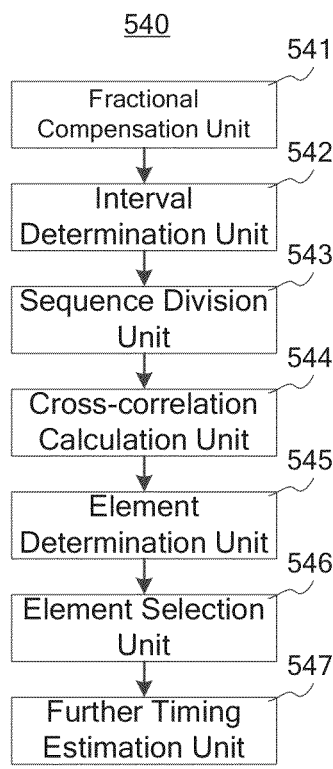

In particular, the further timing estimation module 540 includes: a fractional compensation unit 541, an interval determination unit 542, a sequence division unit 543, a cross-correlation calculation unit 544, an element determination unit 545, an element selection unit 546 and a further timing estimation unit 547, as shown in FIG. 6E.

The fractional compensation unit 541 is configured to apply a frequency offset compensation to the sequence to be analyzed y based on the IFO estimation value $\hat{\epsilon}$ determined by the initial timing estimation module 520 and the FFO estimation value $\hat{\epsilon}_f$ as determined by the initial frequency offset estimation module 530 to obtain a frequency offset compensated sequence to be analyzed y.

The interval determination unit 542 is configured to determine a position interval $[T_{coarse}-R, T_{coarse}+R]$ from the frequency offset compensated sequence to be analyzed y as obtained by the fractional compensation unit 541 based on the initial timing position $T_{coarse}$ determined by the initial timing estimation module 520.

The sequence division unit 543 is configured to divide the frequency offset compensated sequence to be analyzed y as obtained by the fractional compensation unit 541 into 2R+1 data sequences Rx_Search based on the position interval determined by the interval determination unit 542.

The cross-correlation calculation unit 544 is configured to perform a cross-correlation calculation based on the 2R+1 data sequences Rx_Search obtained by the sequence division unit 543 and the PSS LocalPss determined by the initial timing estimation module 520 to obtain 2R+1 cross-correlation result sequences.

The element determination unit 545 is configured to determine a maximum element $pmax_i$ in each of the cross-correlation result sequences obtained by the cross-correlation calculation unit 544 and a position $pd_i$ corresponding to the maximum element $pmax_i$.

The element selection unit 546 is configured to select one of the 2R+1 maximum elements $pmax_i$ determined by the element determination unit 545 that has a largest value, denoted as a largest element pmax.

The further timing estimation unit 547 is configured to determine the position $pd_i$ corresponding to the maximum element pmax as selected by the element selection unit 546 as the fine timing position $T_{fine}$, wherein R is a positive integer equal to or larger than 1.

Figure 6F:
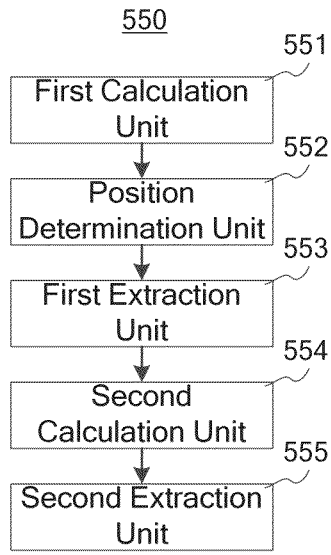

In particular, the secondary sequence segment extraction module 550 includes: a first calculation unit 551, a position determination unit 552, a first extraction unit 553, a second calculation unit 554 and a second extraction unit 555, as shown in FIG. 6F.

The first calculation unit 551 is configured to calculate a start position $T_{SSS}$ of the secondary sequence segment to be analyzed based on a timing relationship between the PSS and the SSS and the fine timing position $T_{fine}$ as determined by the further timing estimation module 540 in accordance with:

$$T_{SSS} = T_{fine} - L_{symbol} - L_{CP}.$$

The position determination unit 552 is configured to determine whether the start position $T_{SSS}$ as calculated by the first calculation unit 551 is located within the sequence to be analyzed y.

The first extraction unit 553 is configured to extract the secondary sequence segment to be analyzed based on the start position $T_{SSS}$ when the position determination unit 552 determines that the start position $T_{SSS}$ is located within the sequence to be analyzed y.

The second calculation unit 554 is configured to recalculate, when the position determination unit 552 determines that the start position $T_{SSS}$ is located outside the sequence to be analyzed y, the start position $T_{SSS}$ in accordance with:

$$T_{SSS} = T_{fine} - L_{symbol} - L_{CP} + L_{half\_of\_wireless\_frame}.$$

The second extraction unit 555 is configured to extract the secondary sequence segment to be analyzed based on the start position $T_{SSS}$ recalculated by the second calculation unit 554, where $T_{fine}$ is a sequence number of the start position of the PSS corresponding to the sequence to be analyzed y, $L_{symbol}$ is a length of a symbol, $L_{CP}$ is a length of a Cyclic Prefix (CP), and $L_{half\_of\_wireless\_frame}$ is a length of half of a wireless data frame.

Figure 6G:
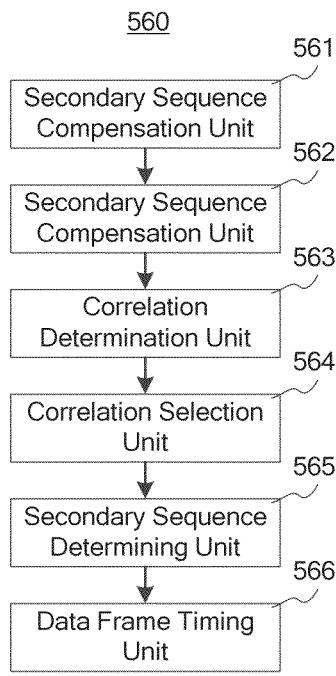

In particular, the SSS detection module 560 includes: a secondary sequence compensation unit 561, a secondary sequence compensation unit 562, a correlation determination unit 563, a correlation selection unit 564, a secondary sequence determining unit 565 and a data frame timing unit 566, as shown in FIG. 6G.

The secondary sequence compensation unit 561 is configured to apply a frequency offset compensation to the secondary sequence segment to be analyzed as extracted by the secondary sequence segment extraction module 550 based on the IFO estimation value $\hat{\epsilon}$ and the FFO estimation value $\hat{\epsilon}_f$ to obtain a frequency offset compensated secondary sequence segment to be analyzed Rx_Sss.

The secondary sequence compensation unit 562 is configured to perform a cross-correlation calculation based on the frequency offset compensated secondary sequence segment to be analyzed Rx_Sss as obtained by the secondary sequence compensation unit 561 and m time domain SSSs generated at the receiver to obtain m cross-correlation result sequences.

The correlation determination unit 563 is configured to determine a maximum element $smax_i$ in each of the cross-correlation result sequences as obtained by the secondary sequence compensation unit 562 and a position $sd_i$ corresponding to the maximum element $smax_i$.

The correlation selection unit 564 is configured to select one of the m maximum elements $smax_i$ as determined by the correlation determination unit 563 that has a largest value, denoted as a largest element smax.

The secondary sequence determining unit 565 is configured to determine the SSS corresponding to the largest element smax as selected by the correlation selection unit 564 as the SSS corresponding to the secondary sequence segment to be analyzed.

The data frame timing unit 566 is configured to determine the timing position of the wireless data frame based on a type of the SSS corresponding to the secondary sequence segment to be analyzed and the position $sd_i$ corresponding to the largest element smax as determined by the secondary sequence determining unit 565, wherein m is a positive integer equal to or larger than 1.

In particular, the further frequency offset estimation module 570 is configured to: assume the secondary sequence segment to be analyzed as Rx_Sss and the SSS corresponding to the secondary sequence segment to be analyzed as LocalSss, and recalculate the FFO estimation value $\hat{\epsilon}_f$ in accordance with:

$$\varepsilon_f = \frac{M}{2\pi} \arg\left\{ \sum_{m=1}^{M-1} \left[ \sum_{n=N(m-1)/M}^{Nm/M-1} (\text{Rx\_Sss}(n) LocalSss^*(n)) \right]^* \left[ \sum_{n=Nm/M}^{N(m+1)/M-1} (\text{Rx\_Sss}(n) LocalSss^*(n)) \right] \right\}$$

where M is a number of blocks, L is a length of a block, N is a length of the PSS, m is a block sequence number of a block and n is a sequence number within a block; and use the IFO estimation value $\hat{\epsilon}$ and the regenerated FFO estimation value $\hat{\epsilon}_f$ as the final frequency offset estimation values.

As discussed above, with the method for signal synchronization according to this embodiment, the initial timing estimation is applied to the down-sampled sequence by means of IFO compensation. The result of the initial timing estimation is used as an input to the initial frequency offset estimation. The result of the initial frequency offset estimation is used an input to the further timing estimation. In this way, the frequency offset compensation and the timing synchronization can be combined with each other to achieve a time domain joint synchronization in downlink. It is possible solve the problem that the existing timing synchronization and frequency offset estimation schemes require a large amount of computation and are thus time-consuming. The computation complexity can be reduced by using the down-sampled sequence and the timing synchronization result and the frequency offset estimation result can be combined with each other to achieve an effect of fast synchronization with high synchronization accuracy. Further, the result of the initial timing estimation and the result of the initial frequency offset estimation are used as an input to the further timing estimation and the result of the initial timing estimation and the result of the further timing estimation are in turn used as an input to the further frequency offset estimation, such that the frequency offset compensation and the timing synchronizadomain joint synchronization in downlink. It is possible to further improve the calculation efficiency of the synchronization process while ensuring the synchronization accuracy.

Fifth Embodiment

Figure 7:
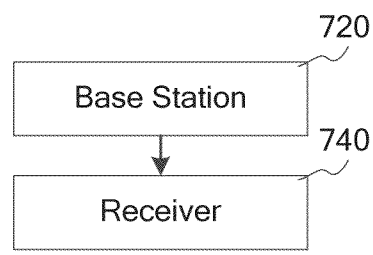
FIG. 7 is a block diagram showing a structure of a communication system according to a fifth embodiment of the present invention.

Reference is now made to FIG. 7, which is a block diagram showing a structure of a communication system according to a fifth embodiment of the present invention. The communication system includes a base station 720 and a receiver 740.

The base station 720 can be a base station compliant with the specifications related to the LTE system.

The receiver 740 can be a receiver according to the third or fourth embodiment.

As discussed above, with the communication system according to this embodiment, the initial timing estimation is applied to the down-sampled sequence by means of IFO compensation. The result of the initial timing estimation is used as an input to the initial frequency offset estimation. The result of the initial frequency offset estimation is used an input to the further timing estimation. In this way, the frequency offset compensation and the timing synchronization can be combined with each other to achieve a time domain joint synchronization in downlink. It is possible solve the problem that the existing timing synchronization and frequency offset estimation schemes require a large amount of computation and are thus time-consuming. The computation complexity can be reduced by using the down-sampled sequence and the timing synchronization result and the frequency offset estimation result can be combined with each other to achieve an effect of fast synchronization with high synchronization accuracy. Further, the result of the initial timing estimation and the result of the initial frequency offset estimation are used as an input to the further timing estimation and the result of the initial timing estimation and the result of the further timing estimation are in turn used as an input to the further frequency offset estimation, such that the frequency offset compensation and the timing synchronization can be further combined with each other to achieve a time domain joint synchronization in downlink. It is possible to further improve the calculation efficiency of the synchronization process while ensuring the synchronization accuracy.

It is to be noted here that the receiver for performing timing synchronization or frequency offset estimation in downlink according to the above embodiment has been described in connection with an example where the receiver is divided into various functional modules. In practice, these functions can be assigned to different functional modules as desired. That is, the internal structure of the device can be divided into different functional modules to implement all or part of the functions described above. Further, the receiver and the method for time domain joint synchronization in downlink according to the above embodiments belong to the same concept. For details of the receiver, reference can be made to the method embodiments and the description thereof will be omitted here.

The numbering of the above embodiments is for the purpose of illustration only and does not represent the ranking of their preferences.

It can be appreciated by those skilled in the art that the all or part of the steps described in the above embodiments can be implemented in hardware, possibly following instructions by a program. Such program can be stored in a computer readable storage medium which can be a Read Only Memory (ROM), a magnetic disk or an optical disc.

The present invention is not limited to the preferred embodiments as described above. Any modifications, equivalents or improvements that can be made without departing from the spirit and principle of the present invention are to be encompassed by the scope of the present invention.

What is claimed is:

1. A method for signal synchronization executed by a receiver comprising:
   receiving signals in a time domain from a transmitter;
   obtaining a sequence to be analyzed y from the received signals in the time domain;
   down-sampling the sequence to be analyzed y by a factor of α to obtain a down-sampled sequence and performing an initial timing estimation based on the down-sampled sequence and n different predetermined Integral Frequency Offset (IFO) candidate values to determine an initial timing position $T_{coarse}$, an IFO estimation $\hat{\epsilon}$ value and a Primary Synchronization Sequence (PSS) corresponding to the sequence to be analyzed y;
   applying an initial frequency offset compensation to the sequence to be analyzed y based on the IFO estimation value $\hat{\epsilon}$ and performing an initial frequency offset estimation based on the initial timing position $T_{coarse}$ and the determined PSS to obtain a Fractional Frequency Offset (FFO) estimation value $\hat{\epsilon}_f$; and
   applying a frequency offset compensation to the sequence to be analyzed y based on the IFO estimation value $\hat{\epsilon}$ and the FFO estimation value $\hat{\epsilon}_f$ and performing a further timing estimation based on the initial timing position $T_{coarse}$ and the determined PSS to obtain a fine timing position $T_{fine}$ as a fine timing position of an Orthogonal Frequency Division Multiplexing (OFDM) symbol block for an OFDM symbol block synchronization between the receiver and the transmitter,
   wherein n is a positive integer equal to or larger than 1.

2. The method of claim 1, further comprising, after the fine timing position $T_{fine}$ is obtained:
   extracting a secondary sequence segment to be analyzed from the sequence to be analyzed y based on the fine timing position $T_{fine}$; and
   applying a frequency offset compensation to the secondary sequence segment to be analyzed based on the IFO estimation value $\hat{\epsilon}$ and the FFO estimation value $\hat{\epsilon}_f$ and determining a Secondary Synchronization Sequence (SSS) corresponding to the secondary sequence segment to be analyzed and a timing position of a wireless data frame using a cross-correlation calculation.

3. The method of claim 2, further comprising, after applying a frequency offset compensation to the secondary sequence segment to be analyzed based on the IFO estimation value $\hat{\epsilon}$ and the FFO estimation value $\hat{\epsilon}_f$ and determining a Secondary Synchronization Sequence (SSS) corresponding to the secondary sequence segment to be analyzed and a timing position of a wireless data frame using a cross-correlation calculation:
   performing a further frequency offset estimation based on the secondary sequence segment to be analyzed and the SSS corresponding to the secondary sequence segment to be analyzed to regenerate a FFO estimation value $\hat{\epsilon}_f$ and using the IFO estimation value $\hat{\epsilon}$ and the regenerated FFO estimation value $\hat{\epsilon}_f$ as final frequency offset estimation values.

4. The method of claim 1, wherein said obtaining a sequence to be analyzed y from a received time domain signal comprises:
   extracting from the received time domain signal a sequence having a sampling rate equal to a maximum bandwidth sampling rate and a length of $N_{buffer}$ using a sliding window; and applying a narrow-band filtering to the sequence having the length of $N_{buffer}$ to obtain the sequence to be analyzed y that is located at a center position of a transmission bandwidth and has a bandwidth of a predetermined value, wherein $N_{buffer}$ belongs to (half of wireless frame length, half of wireless frame length+one symbol length) and the predetermined value belongs to [1.08 MHz, 1.25 MHz].

5. The method of claim 1, wherein said down-sampling the sequence to be analyzed y by a factor of α to obtain a down-sampled sequence and performing an initial timing estimation based on the down-sampled sequence and n different predetermined Integral Frequency Offset (IFO) candidate values to determine an initial timing position $T_{coarse}$, an IFO estimation value $\hat{\epsilon}$ and a Primary Synchronization Sequence (PSS) corresponding to the sequence to be analyzed y comprises:

down-sampling the sequence to be analyzed y by the factor of α to obtain the down-sampled sequence, where α is $2^n$;

applying a frequency offset compensation to the down-sampled sequence based on the n different predetermined IFO candidate values to obtain n IFO compensated down-sampled sequences;

performing a cross-correlation calculation based on the n IFO compensated down-sampled sequences and k time domain PSSs generated at the receiver to obtain k*n cross-correlation result sequences;

determining a maximum element $max_i$ in each of the cross-correlation result sequences and a position $d_i$ corresponding to the maximum element $max_i$;

selecting one of the k*n maximum elements $max_i$ that has a largest value, denoted as a largest element max;

detecting whether the largest element max is larger than a predetermined threshold $P_{th}$; and determining, when it is detected that the largest element max is larger than the predetermined $P_{th}$, the position $d_i$ corresponding to the largest element max as the initial timing position $T_{coarse}$, the predetermined IFO candidate value corresponding to the cross-correlation result sequence to which the largest element max belongs as the IFO estimation value $\hat{\epsilon}$, and the PSS corresponding to the cross-correlation result sequence to which the largest element max belongs as the PSS corresponding to the sequence to be analyzed y, wherein k is a positive integer equal to or larger than 1.

6. The method of claim 5, wherein said performing a cross-correlation calculation based on the n IFO compensated down-sampled sequences and k time domain PSSs generated at the receiver to obtain k*n cross-correlation result sequences comprises:

assuming the IFO compensated down-sampled sequence as $y_{compensate}$ and the time domain PSS as pss_time_downsampling, and performing the cross-correlation calculation in accordance with the following block-wise cross-correlation equation:

$$P(d) = \sum_{m=1}^{M} \left| \sum_{n=(m-1)L}^{mL-1} (y_{compensate}(n+d)\text{pss\_time\_downsampling}(n)) \right|^2,$$

$(N = ML)$ where M is a number of blocks, L is a length of a block, N is a length of the PSS, m is a block sequence number of a block and n is a sequence number within a block.

7. The method of claim 1, wherein said applying a frequency offset compensation to the sequence to be analyzed y based on the IFO estimation value $\hat{\epsilon}$ and performing an initial frequency offset estimation based on the initial timing position $T_{coarse}$ and the determined PSS to obtain a Fractional Frequency Offset (FFO) estimation value $\hat{\epsilon}_f$ comprises:

applying a frequency offset compensation to the sequence to be analyzed y based on the IFO estimation value $\hat{\epsilon}$ to obtain a frequency offset compensated sequence to be analyzed y;

extracting from the frequency offset compensated sequence to be analyzed y a primary sequence segment to be analyzed Rx_rss based on the initial timing position $T_{coarse}$;

performing an initial frequency offset estimation based on the primary sequence segment to be analyzed Rx_rss and the determined PSS LocalPss to obtain the FFO estimation value $\hat{\epsilon}_f$ in accordance with:

$$\varepsilon_f = \frac{M}{2\pi}\arg\left\{\sum_{m=1}^{M-1}\left[\sum_{n=N(m-1)/M}^{Nm/M-1}(\text{Rx\_Pss}(n)LocalPss^*(n))\right]^*\left[\sum_{n=Nm/M}^{N(m+1)/M-1}(\text{Rx\_Pss}(n)LocalPss^*(n))\right]\right\}$$

where M is a number of blocks, L is a length of a block, N is a length of the PSS, m is a block sequence number of a block and n is a sequence number within a block.

8. The method of claim 1, wherein said applying a frequency offset compensation to the sequence to be analyzed y based on the IFO estimation value $\hat{\epsilon}$ and the FFO estimation value $\hat{\epsilon}_f$ and performing a further timing estimation based on the initial timing position $T_{coarse}$ and the determined PSS to obtain a fine timing position $T_{fine}$ comprises:

applying a frequency offset compensation to the sequence to be analyzed y based on the IFO estimation value $\hat{\epsilon}$ and the FFO estimation value $\hat{\epsilon}_f$ to obtain a frequency offset compensated sequence to be analyzed y;

determining a position interval $[T_{coarse}-R, T_{coarse}+R]$ from the frequency offset compensated sequence to be analyzed y based on the initial timing position $T_{coarse}$;

dividing the frequency offset compensated sequence to be analyzed y into 2R+1 data sequences Rx_Search based on the position interval;

performing a cross-correlation calculation based on the 2R+1 data sequences Rx_Search and the determined PSS LocalPss to obtain 2R+1 cross-correlation result sequences;

determining a maximum element $pmax_i$ in each of the cross-correlation result sequences and a position $pd_i$ corresponding to the maximum element $pmax_i$;

selecting one of the 2R+1 maximum elements $pmax_i$ that has a largest value, denoted as a largest element pmax; and determining the position $pd_i$ corresponding to the maximum element pmax as the fine timing position $T_{fine}$;

wherein R is a positive integer equal to or larger than 1.

9. The method of claim 2, wherein said extracting a secondary sequence segment to be analyzed from the sequence to be analyzed y based on the fine timing position $T_{fine}$ comprises:

calculating a start position $T_{SSS}$ of the secondary sequence segment to be analyzed based on a timing relationship between the PSS and the SSS and the fine timing position $T_{fine}$ in accordance with:

$$T_{SSS}=T_{fine}-L_{symbol}-L_{CP};$$

determining whether the start position $T_{SSS}$ is located within the sequence to be analyzed y;

extracting the secondary sequence segment to be analyzed based on the start position $T_{SSS}$ when it is determined that the start position $T_{SSS}$ is located within the sequence to be analyzed y;

recalculating, when it is determined that the start position $T_{SSS}$ is located outside the sequence to be analyzed y, the start position $T_{SSS}$ in accordance with:

$$T_{SSS}=T_{fine}-L_{symbol}-L_{CP}+L_{half\_of\_wireless\_frame};$$

extracting the secondary sequence segment to be analyzed based on the recalculated start position $T_{SSS}$, where $T_{fine}$ is a sequence number of the start position of the PSS corresponding to the sequence to be analyzed y, $L_{symbol}$ is a length of a symbol, $L_{CP}$ is a length of a Cyclic Prefix (CP), and $L_{half\_of\_wireless\_frame}$ is a length of half of a wireless data frame.

10. The method of claim 9, wherein said applying a frequency offset compensation to the secondary sequence segment to be analyzed based on the IFO estimation value $\hat{\epsilon}$ and the FFO estimation value and $\hat{\epsilon}_f$ determining a Secondary Synchronization Sequence (SSS) corresponding to the secondary sequence segment to be analyzed and a timing position of a wireless data frame using a cross-correlation calculation comprises:

applying a frequency offset compensation to the secondary sequence segment to be analyzed based on the IFO estimation value $\hat{\epsilon}$ and the FFO estimation value $\hat{\epsilon}_f$ to obtain a frequency offset compensated secondary sequence segment to be analyzed Rx_Sss;

performing a cross-correlation calculation based on the frequency offset compensated secondary sequence segment to be analyzed Rx_Sss and m time domain SSSs generated at the receiver to obtain m cross-correlation result sequences;

determining a maximum element $smax_i$ in each of the cross-correlation result sequences and a position $sd_i$ corresponding to the maximum element $smax_i$;

selecting one of the m maximum elements $smax_i$ that has a largest value, denoted as a largest element smax;

determining the SSS corresponding to the largest element smax as the SSS corresponding to the secondary sequence segment to be analyzed; and determining the timing position of the wireless data frame based on a type of the SSS corresponding to the secondary sequence segment to be analyzed and the position $sd_i$ corresponding to the largest element smax, wherein m is a positive integer equal to or larger than 1.

11. The method of claim 3, wherein said performing a further frequency offset estimation based on the secondary sequence segment to be analyzed and the SSS corresponding to the secondary sequence segment to be analyzed to regenerate a FFO estimation value $\hat{\epsilon}_f$ and using the IFO estimation value $\hat{\epsilon}$ and the regenerated FFO estimation value $\hat{\epsilon}_f$ as final frequency offset estimation values comprises:

assuming the secondary sequence segment to be analyzed as Rx_Sss and the SSS corresponding to the secondary sequence segment to be analyzed as LocalSss and recalculating the FFO estimation value $\hat{\epsilon}_f$ in accordance with:

$$\varepsilon_f = \frac{M}{2\pi}\arg\left\{\sum_{m=1}^{M-1}\left[\sum_{n=N(m-1)/M}^{Nm/M-1}(\text{Rx\_Sss}(n)LocalSss^*(n))\right]^*\left[\sum_{n=Nm/M}^{N(m+1)/M-1}(\text{Rx\_Sss}(n)LocalSss^*(n))\right]\right\}$$

where M is a number of blocks, L is a length of a block, N is a length of the PSS, m is a block sequence number of a block and n is a sequence number within a block; and using the IFO estimation value $\hat{\epsilon}$ and the regenerated FFO estimation value $\hat{\epsilon}_f$ as the final frequency offset estimation values.

12. A receiver comprising:

a processor comprising hardware being configured to:

receive signals in a time domain from a transmitter;

obtain a sequence to be analyzed y from received signals in time domain;

down-sample the sequence to be analyzed y as obtained by a factor of α to obtain a down-sampled sequence and perform an initial timing estimation based on the down-sampled sequence and n different predetermined Integral Frequency Offset (IFO) candidate values to determine an initial timing position $T_{coarse}$, an IFO estimation value $\hat{\epsilon}$ and a Primary Synchronization Sequence (PSS) corresponding to the sequence to be analyzed y;

apply an initial frequency offset compensation to the sequence to be analyzed y as obtained based on the IFO estimation value $\hat{\epsilon}$ as determined and perform an initial frequency offset estimation based on the initial timing position $T_{coarse}$ as determined and the determined PSS to obtain a Fractional Frequency Offset (FFO) estimation value $\hat{\epsilon}_f$; and apply a frequency offset compensation to the sequence to be analyzed y as obtained based on the IFO estimation value $\hat{\epsilon}$ as determined and the FFO estimation value $\hat{\epsilon}_f$ as determined and perform a further timing estimation based on the initial timing position $T_{coarse}$ as determined and the determined PSS to obtain a fine timing position $T_{fine}$ as a fine timing position of an Orthogonal Frequency Division Multiplexing (OFDM) symbol block for an OFDM symbol block synchronization between the receiver and the transmitter, wherein n is a positive integer equal to or larger than 1.

13. The receiver of claim 12, wherein the hardware is further configured to:

extract a secondary sequence segment to be analyzed from the sequence to be analyzed y based on the fine timing position $T_{fine}$; and apply a frequency offset compensation to the secondary sequence segment to be analyzed as extracted based on the IFO estimation value $\hat{\epsilon}$ and the FFO estimation value $\hat{\epsilon}_f$ and determine a Secondary Synchronization Sequence (SSS) corresponding to the secondary sequence segment to be analyzed and a timing position of a wireless data frame using a cross-correlation calculation.

14. The receiver of claim 13, the hardware is further configured to perform a further frequency offset estimation based on the secondary sequence segment to be analyzed as extracted and the SSS corresponding to the secondary sequence segment to be analyzed as determined to regenerate a FFO estimation value $\hat{\epsilon}_f$ and use the IFO estimation value $\hat{\epsilon}$ and the regenerated FFO estimation value $\hat{\epsilon}_f$ as final frequency offset estimation values.

15. The receiver of claim 12, wherein the hardware is further configured to:
    extract from the received signals in time domain a sequence having a sampling rate equal to a maximum bandwidth sampling rate and a length of $N_{buffer}$ using a sliding window; and
    apply a narrow-band filtering to the sequence having the length of $N_{buffer}$ as extracted to obtain the sequence to be analyzed y that is located at a center position of a transmission bandwidth and has a bandwidth of a predetermined value,
    wherein $N_{buffer}$ belongs to (half of wireless frame length, half of wireless frame length+one symbol length) and the predetermined value belongs to [1.08 MHz, 1.25 MHz].

16. The receiver of claim 12, wherein the hardware is further configured to:
    down-sample the sequence to be analyzed y by the factor of $\alpha$ to obtain the down-sampled sequence, where $\alpha$ is $2^n$;
    apply a frequency offset compensation to the down-sampled sequence obtained based on the n different predetermined IFO candidate values to obtain n IFO compensated down-sampled sequences;
    perform a cross-correlation calculation based on the n IFO compensated down-sampled sequences obtained and k time domain PSSs generated at the receiver to obtain k*n cross-correlation result sequences;
    determine a maximum element $max_i$ in each of the cross-correlation result sequences obtained and a position $d_i$ corresponding to the maximum element $max_i$;
    select one of the k*n maximum elements $max_i$ that has a largest value, denoted as a largest element max;
    detect whether the largest element max is larger than a predetermined threshold $P_{th}$; and
    determine, when it is detected that the largest element max is larger than the predetermined $P_{th}$, the position $d_i$ corresponding to the largest element max as the initial timing position $T_{coarse}$, the predetermined IFO candidate value corresponding to the cross-correlation result sequence to which the largest element max belongs as the IFO estimation value $\hat{\epsilon}$, and the PSS corresponding to the cross-correlation result sequence to which the largest element max belongs as the PSS corresponding to the sequence to be analyzed y,
    wherein k is a positive integer equal to or larger than 1.

17. The receiver of claim 16, wherein the hardware is further configured to assume the IFO compensated down-sampled sequence as $y_{compensate}$ and the time domain PSS as pss_time_downsampling, and perform the cross-correlation calculation in accordance with the following block-wise cross-correlation equation:

$$P(d) = \sum_{m=1}^{M} \left| \sum_{n=(m-1)L}^{mL-1} (y_{compensate}(n+d) \text{pss\_time\_downsampling}(n)) \right|^2 ,$$

$(N = ML)$ where M is a number of blocks, L is a length of a block, N is a length of the PSS, m is a block sequence number of a block and n is a sequence number within a block.

18. The receiver of claim 12, wherein the hardware is further configured to:
    apply a frequency offset compensation to the sequence to be analyzed y based on the IFO estimation value $\hat{\epsilon}$ to obtain a frequency offset compensated sequence to be analyzed y;
    extract from the frequency offset compensated sequence to be analyzed y a primary sequence segment to be analyzed Rx_rss based on the initial timing position $T_{coarse}$;
    perform an initial frequency offset estimation based on the primary sequence segment to be analyzed Rx_rss and the determined PSS LocalPss to obtain the FFO estimation value $\hat{\epsilon}_f$ in accordance with:

$$\varepsilon_f = \frac{M}{2\pi} \arg \left\{ \sum_{m=1}^{M-1} \left[ \sum_{n=N(m-1)/M}^{Nm/M-1} (\text{Rx\_Pss}(n) LocalPss^*(n)) \right]^* \left[ \sum_{n=Nm/M}^{N(m+1)/M-1} (\text{Rx\_Pss}(n) LocalPss^*(n)) \right] \right\}$$

where M is a number of blocks, L is a length of a block, N is a length of the PSS, m is a block sequence number of a block and n is a sequence number within a block.

19. The receiver of claim 12, wherein the hardware is further configured to:
    apply a frequency offset compensation to the sequence to be analyzed y based on the IFO estimation value $\hat{\epsilon}$ and the FFO estimation value $\hat{\epsilon}_f$ to obtain a frequency offset compensated sequence to be analyzed y;
    determine a position interval $[T_{coarse}-R, T_{coarse}+R]$ from the frequency offset compensated sequence to be analyzed y based on the initial timing position $T_{coarse}$;
    divide the frequency offset compensated sequence to be analyzed y into 2R+1 data sequences Rx_Search based on the position interval determined;
    perform a cross-correlation calculation based on the 2R+1 data sequences Rx_Search and the determined PSS LocalPss to obtain 2R+1 cross-correlation result sequences;
    determine a maximum element $pmax_i$ in each of the cross-correlation result sequences and a position $pd_i$ corresponding to the maximum element $pmax_i$;
    select one of the 2R+1 maximum elements $pmax_i$ that has a largest value, denoted as a largest element pmax; and
    determine the position $pd_i$ corresponding to the maximum element pmax as the fine timing position $T_{fine}$,
    wherein R is a positive integer equal to or larger than 1.

20. The receiver of claim 13, wherein the hardware is further configured to:
    calculate a start position $T_{SSS}$ of the secondary sequence segment to be analyzed based on a timing relationship between the PSS and the SSS and the fine timing position $T_{fine}$ in accordance with:

$T_{SSS} = T_{fine} - L_{symbol} - L_{CP}$;

determine whether the start position $T_{SSS}$ is located within the sequence to be analyzed y;
    extract the secondary sequence segment to be analyzed based on the start position $T_{SSS}$ when it is determined that the start position $T_{SSS}$ is located within the sequence to be analyzed y;

recalculate, when it is determined that the start position $T_{SSS}$ is located outside the sequence to be analyzed y, the start position $T_{SSS}$ in accordance with:

$$T_{SSS}=T_{fine}-L_{symbol}-L_{CP}+L_{half\_of\_wireless\_frame};$$

extract the secondary sequence segment to be analyzed based on the recalculated start position $T_{SSS}$, where $T_{fine}$ is a sequence number of the start position of the PSS corresponding to the sequence to be analyzed y, $L_{symbol}$ is a length of a symbol, $L_{CP}$ is a length of a Cyclic Prefix (CP), and $L_{half\_of\_wireless\_frame}$ is a length of half of a wireless data frame.

* * * * *